US012794506B2

(12) United States Patent
Hitomi et al.

(10) Patent No.: US 12,794,506 B2
(45) Date of Patent: Nov. 10, 2026

(54) RADIO FREQUENCY MODULE, COMMUNICATION DEVICE AND COMMUNICATION METHOD

(71) Applicant: Murata Manufacturing Co., Ltd., Nagaokakyo (JP)

(72) Inventors: Shinya Hitomi, Nagaokakyo (JP); Satoshi Tanaka, Nagaokakyo (JP); Hirotsugu Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 322 days.

(21) Appl. No.: 18/589,444

(22) Filed: Feb. 28, 2024

(65) Prior Publication Data

US 2024/0275419 A1 Aug. 15, 2024

Related U.S. Application Data

(63) Continuation of application No. PCT/JP2022/030815, filed on Aug. 12, 2022.

(30) Foreign Application Priority Data

Sep. 2, 2021 (JP) ................................ 2021-143455

(51) Int. Cl.
*H04B 1/3827* (2015.01)
*H04B 1/00* (2006.01)
*H04W 52/36* (2009.01)

(52) U.S. Cl.
CPC ........ *H04B 1/3838* (2013.01); *H04W 52/367* (2013.01); *H04B 1/005* (2013.01)

(58) Field of Classification Search
CPC ........ H04B 1/005; H04B 1/04; H04B 1/3827; H04B 1/3838; H04W 52/367
See application file for complete search history.

(56) References Cited

U.S. PATENT DOCUMENTS

2005/0124305 A1 6/2005 Stichelbout
2010/0278100 A1* 11/2010 West .................. H04W 52/241 370/328

(Continued)

FOREIGN PATENT DOCUMENTS

CN 109714488 A * 5/2019
JP 2011-521499 A 7/2011

(Continued)

OTHER PUBLICATIONS

Xing, "Communication Method and Terminal," English Machine Translation of Xing (WO 2023/000331 A1), Clarivate Analytics, pp. 1-18 (Year: 2026).*

(Continued)

*Primary Examiner* — Thomas R Cairns
*Assistant Examiner* — Kai Chang
(74) *Attorney, Agent, or Firm* — XSENSUS LLP

(57) ABSTRACT

A radio-frequency circuit includes a power amplifier circuit and a first filter circuit. The power amplifier circuit supports a predetermined power class which allows for first maximum output power. The first maximum output power is maximum output power of power class 2 or higher. The first filter circuit is connected to the power amplifier circuit and has a pass band including an uplink operating band of a first band for Frequency Division Duplex. The predetermined power class is applied to transmission of a signal of the first band in a first period. The first period includes first and second sub-periods.

20 Claims, 11 Drawing Sheets

(56) References Cited

U.S. PATENT DOCUMENTS

| | | | | |
|---|---|---|---|---|
| 2015/0133067 | A1 | 5/2015 | Chang et al. | |
| 2017/0064641 | A1 | 3/2017 | Logan et al. | |
| 2017/0318546 | A1* | 11/2017 | Suzuki | H04W 52/34 |
| 2021/0258028 | A1* | 8/2021 | Tanaka | H04B 1/0458 |
| 2022/0132438 | A1* | 4/2022 | Cha | H04W 52/246 |
| 2022/0303914 | A1* | 9/2022 | Abdel Shahid | H04W 52/267 |
| 2022/0368366 | A1* | 11/2022 | Sambhwani | H04B 1/3838 |
| 2024/0137877 | A1* | 4/2024 | Guo | H04W 72/0473 |
| 2025/0261125 | A1* | 8/2025 | Kim | H04W 52/42 |

FOREIGN PATENT DOCUMENTS

| | | | | | |
|---|---|---|---|---|---|
| WO | WO-2013141791 | A1 * | 9/2013 | | H04W 52/34 |
| WO | 2015/029298 | A1 | 3/2015 | | |
| WO | WO-2023000331 | A1 * | 1/2023 | | H04W 52/30 |

OTHER PUBLICATIONS

Feng, "Terminal Device Working Mode Adjusting Method, Device, Terminal Device and Storage Medium," English Machine Translation of Feng (CN 109714488 A), Clarivate Analytics, pp. 1-14 (Year: 2026).*

International Search Report and Written Opinion mailed on Nov. 8, 2022, received for International Patent Application No. PCT/JP2022/030815, filed on Aug. 12, 2022, 08 pages including English Translation.

* cited by examiner

RADIO FREQUENCY MODULE, COMMUNICATION DEVICE AND COMMUNICATION METHOD

CROSS-REFERENCE TO RELATED APPLICATIONS

This is a continuation application of PCT International Application No. PCT/JP2022/030815 filed on Aug. 12, 2022, designating the United States of America, which is based on and claims priority to Japanese Patent Application No. 2021-143455 filed on Sep. 2, 2021. The entire disclosures of the above-identified applications, including the specifications, drawings, and claims are incorporated herein by reference in their entirety.

BACKGROUND

Technical Field

The present invention relates to a radio-frequency circuit, a communication device, and a communication method.

Background

Currently, 3GPP (registered trademark) (3rd Generation Partnership Project) is examining the application of a power class that allows for maximum output power higher than before (power class 1, 1.5, and 2, for example) to an FDD (Frequency Division Duplex) band.

CITATION LIST

Patent Literature

PTL1: U.S. Unexamined Patent Application Publication No. 2015/0133067

SUMMARY

Technical Problems

However, if a power class that allows for maximum output power higher than before is applied to an FDD band, a user is exposed to stronger radio frequencies, which may harm his/her health.

To address this issue, the present invention provides a radio-frequency circuit, a communication device, and a communication method that can make it less likely to harm the health of a user when a power class that allows for maximum output power higher than before is applied to an FDD band.

Solutions

A radio-frequency circuit according to an aspect of the invention includes a power amplifier circuit and a first filter circuit. The power amplifier circuit supports a predetermined power class which allows for first maximum output power. The first maximum output power is maximum output power of power class 2 or higher. The first filter circuit is connected to the power amplifier circuit and has a pass band including an uplink operating band of a first band for Frequency Division Duplex. The predetermined power class is applied to transmission of a signal of the first band in a first period. The first period includes first and second sub-periods. (i) If a first SAR (Specific Absorption Rate), which is found at a time of the transmission of a signal of the first band with the first maximum output power in the first period, does not exceed a standard value, the power amplifier circuit amplifies a signal of the first band so that output power of the signal of the first band is limited to the first maximum output power in the first and second sub-periods. (ii) If the first SAR exceeds the standard value, the power amplifier circuit amplifies a signal of the first band so that output power of the signal of the first band is limited to the first maximum output power in the first sub-period and so that output power of the signal of the first band is limited to second maximum output power in the second sub-period. The second maximum output power is lower than the first maximum output power.

A communication method according to an aspect of the invention includes: if a predetermined power class is applied to transmission of a signal of a first band in a first period including first and second sub-periods, the predetermined power class allowing for first maximum output power, the first maximum output power being maximum output power of power class 2 or higher, (i) limiting output power of a signal of the first band to the first maximum output power in the first and second sub-periods if a first SAR, which is found at a time of transmission of a signal of the first band with the first maximum output power in the first period, does not exceed a standard value; and (ii) limiting output power of a signal of the first band to the first maximum output power in the first sub-period and limiting output power of the signal of the first band to second maximum output power in the second sub-period if the first SAR exceeds the standard value, the second maximum output power being lower than the first maximum output power.

A radio-frequency circuit according to an aspect of the invention includes a power amplifier circuit and a filter circuit. The power amplifier circuit supports a predetermined power class which allows for first maximum output power. The first maximum output power is maximum output power of power class 2 or higher. The filter circuit is connected to the power amplifier circuit and has a pass band including an uplink operating band of a first band for Frequency Division Duplex. If the predetermined power class is applied to transmission of a signal of the first band, the power amplifier circuit amplifies a signal of the first band so that output power of the signal of the first band is limited to variable maximum output power. The variable maximum output power is repeatedly switched between the first maximum output power and second maximum output power. The second maximum output power is lower than the first maximum output power.

A communication method according to an aspect of the invention includes: if a predetermined power class is applied to transmission of a signal of a first band, the predetermined power class allowing for first maximum output power, the first maximum output power being maximum output power of power class 2 or higher, limiting output power of a signal of the first band to variable maximum output power; and repeatedly switching the variable maximum output power between the first maximum output power and second maximum output power, the second maximum output power being lower than the first maximum output power.

Additional benefits and advantages of the disclosed embodiments will become apparent from the specification and drawings. The benefits and advantages may be individually obtained by the various embodiments and features of the specification and drawings, which need not all be provided in order to obtain one or more of such benefits and advantages.

Advantageous Effects

A radio-frequency circuit according to an aspect of the present invention can make it less likely to harm the health of a user when a power class that allows for maximum output power higher than before is applied to an FDD band.

BRIEF DESCRIPTION OF THE DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

Figure 1:
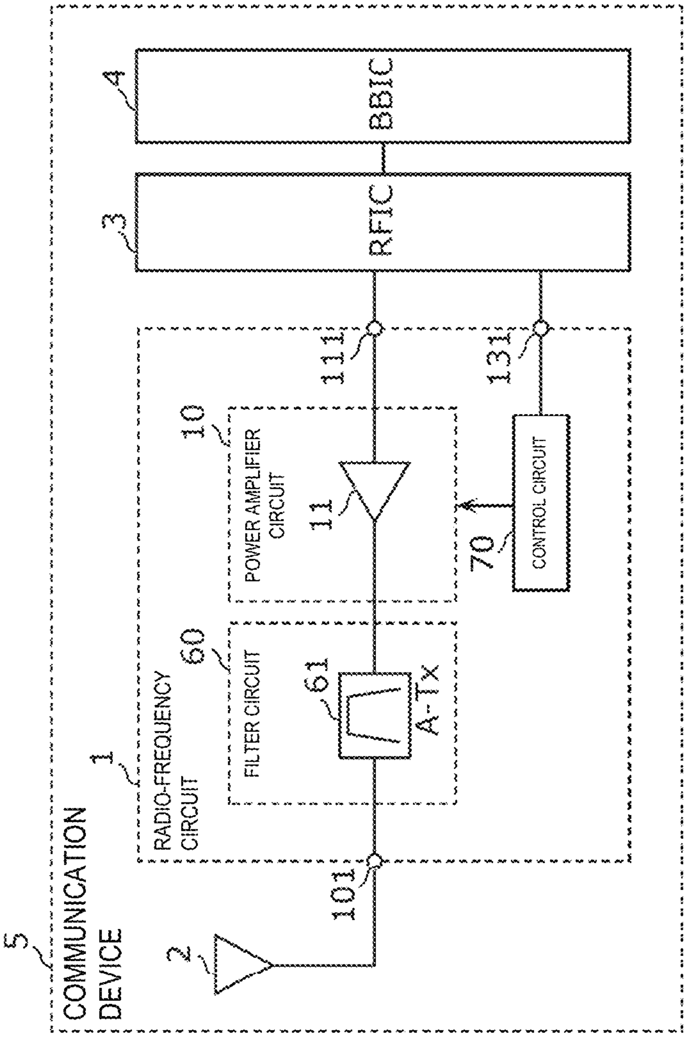
FIG. 1 is a circuit diagram of a radio-frequency circuit and a communication device according to a first embodiment.

Embodiments of the invention will be described below in detail with reference to the drawings. The embodiments described below illustrate general or specific examples. Numerical values, configurations, materials, elements, and positions and connection states of the elements illustrated in the following embodiments are only examples and are not intended to limit the invention.

The drawings are only schematically shown and are not necessarily precisely illustrated. For the sake of representation, the drawings may be illustrated in an exaggerated manner or with omissions and the ratios of elements in the drawings may be adjusted according to the necessity. The shapes, positional relationships, and ratios of elements in the drawings may be different from those of the actual elements. In the drawings, substantially identical elements are designated by like reference numeral, and the same explanation of such elements will not be repeated or be merely simplified.

In the circuit configurations of the invention, "A is connected to B" includes, not only the meaning that A is directly connected to B using a connecting terminal and/or a wiring conductor, but also the meaning that A is electrically connected to B via another circuit element. "A is directly connected to B" means that A is directly connected to B using a connecting terminal and/or a wiring conductor without using another circuit element therebetween. "An element is connected between A and B" means that the element is connected to both A and B between A and B and includes the meaning that the element is connected in series with a path connecting A and B and also that the element is connected between this path and a ground.

(First Embodiment)

[1.1 Circuit Configurations of Radio-Frequency Circuit 1 and Communication Device 5]

The circuit configuration of a radio-frequency circuit 1 and that of a communication device 5 including the radio-frequency circuit 1 according to a first embodiment will be described below with reference to FIG. 1. FIG. 1 is a circuit diagram of the radio-frequency circuit 1 and the communication device 5 according to the first embodiment.

[1.1.1 Circuit Configuration of Communication Device 5]

The communication device 5 corresponds to what is known as UE (User Equipment) and is typically a mobile phone, a smartphone, or a tablet computer, for example. The communication device 5 according to the first embodiment includes the radio-frequency circuit 1, an antenna 2, an RFIC (Radio Frequency Integrated Circuit) 3, and a BBIC (Baseband Integrated Circuit) 4.

The radio-frequency circuit 1 transfers a radio-frequency signal between the antenna 2 and the RFIC 3. The internal configuration of the radio-frequency circuit 1 will be discussed later.

The antenna 2 is connected to an antenna connection terminal 101 of the radio-frequency circuit 1. The antenna 2 receives a radio-frequency signal from the radio-frequency circuit 1 and outputs the radio-frequency signal to an external source.

The RFIC 3 is an example of a signal processing circuit that processes a radio-frequency signal. More specifically, the RFIC 3 performs signal processing, such as up-conversion, on a transmission signal received from the BBIC 4 and outputs the resulting radio-frequency transmission signal to a transmit path of the radio-frequency circuit 1. The RFIC 3 includes a controller that controls elements of the radio-frequency circuit 1, such as a switch circuit and an amplifier circuit. All or some of the functions of the RFIC 3 as the controller may be installed in an element outside the RFIC 3, such as in the BBIC 4 or the radio-frequency circuit 1.

The BBIC 4 is a baseband signal processing circuit that performs signal processing by using an intermediate frequency band, which is lower than a radio-frequency signal transferred by the radio-frequency circuit 1. Examples of signals to be processed by the BBIC 4 are image signals for displaying images and/or audio signals for performing communication via a speaker.

The antenna 2 and the BBIC 4 are not essential elements for the communication device 5 of the first embodiment.

[1.1.2 Circuit Configuration of Radio-Frequency Circuit 1]

The circuit configuration of the radio-frequency circuit 1 will now be described below. As illustrated in FIG. 1, the radio-frequency circuit 1 includes a power amplifier circuit 10, a filter circuit 60, a control circuit 70, the antenna connection terminal 101, a radio-frequency input terminal 111, and a control terminal 131.

The antenna connection terminal 101 is connected to the antenna 2 at the outside of the radio-frequency circuit 1.

The radio-frequency input terminal 111 is an input terminal for receiving a transmission signal of FDD band A from the outside of the radio-frequency circuit 1. In the first embodiment, the radio-frequency input terminal 111 is connected to the RFIC 3 at the outside the radio-frequency circuit 1.

Band A is an example of a first band. Band A is a frequency band to be used for a communication system constructed using a RAT (Radio Access Technology). Such a frequency band is predefined by a standardizing body (such as 3GPP and IEEE (Institute of Electrical and Electronics Engineers)), for example. As the communication system, a 5GNR (5th Generation New Radio) system, an LTE (Long Term Evolution) system, and a WLAN (Wireless Local Area Network) system, for example, may be used. However, the communication system is not limited to these types of systems.

The control terminal 131 is connected to the RFIC 3 at the outside of the radio-frequency circuit 1. The control terminal 131 is a terminal for transferring a control signal. That is, the control terminal 131 is a terminal for receiving a control signal from the outside of the radio-frequency circuit 1 and/or a terminal for supplying a control signal to the outside of the radio-frequency circuit 1. A control signal is a signal for controlling an electronic circuit included in the radio-frequency circuit 1. More specifically, a control signal is a digital signal for controlling the power amplifier circuit 10.

The power amplifier circuit 10 is connected between the radio-frequency input terminal 111 and the filter circuit 60 and is able to amplify a transmission signal of band A by using a power supply voltage supplied from the outside of the radio-frequency circuit 1. The power amplifier circuit 10 supports a predetermined power class that allows for first maximum output power, which is the maximum output power of power class 2 or higher.

The power class is the classification of output power of UE, which is defined by the maximum output power of the UE, for example. As the value of the power class is smaller, output power is higher. For example, 3GPP defines the values of the maximum output power of the individual power classes as follows: power class 1 is 31 dBm; power class 1.5 is 29 dBm; power class 2 is 26 dBm; and power class 3 is 23 dBm.

The predetermined power class is a power class that allows for the maximum output power of 26 dBm, which is the maximum output power of power class 2, or higher. According to the current 3GPP definitions, as the predetermined power class, power class 1 that allows for 31 dBm, power class 1.5 that allows for 29 dBm, and power class 2 that allows for 26 dBm can be used.

The maximum output power of UE is determined by the output power at the end portion of an antenna of the UE. The maximum output power of UE is measured by a method defined by 3GPP, for example. For instance, in FIG. 1, the maximum output power can be determined by measuring radiation power of the antenna 2. Instead of measuring radiation power, output power of the antenna 2 may be measured by providing a terminal near the antenna 2 and by connecting a measurement instrument (such as a spectrum analyzer) to the terminal.

The power class supported by a power amplifier circuit can be identified by the maximum output power of the power amplifier circuit. For example, the maximum output power of a power amplifier circuit which supports power class 2 is higher than 26 dBm. Typically, as the maximum output power of a power amplifier circuit is higher, the size of the power amplifier circuit is larger. Accordingly, as a result of comparing the sizes of two power amplifier circuits, the relative power class supported by one power amplifier circuit and that by the other power amplifier circuit may be compared.

In the first embodiment, the power amplifier circuit 10 includes a power amplifier 11. The power amplifier 11 supports the predetermined power class. That is, the power amplifier 11 is able to amplify a transmission signal of band A up to power higher than the first maximum output power of the predetermined power class. The configuration of the power amplifier circuit 10 is not limited to the above-described configuration. For example, the power amplifier circuit 10 may be a multistage amplifier circuit.

The filter circuit 60 is an example of a first filter circuit and has a pass band including the uplink operating band of band A. The filter circuit 60 is connected between the antenna connection terminal 101 and the power amplifier circuit 10. In the first embodiment, the filter circuit 60 includes a filter 61 having a pass band including the uplink operating band of band A.

The filter 61 is connected between the antenna connection terminal 101 and the power amplifier circuit 10. More specifically, one end of the filter 61 is connected to the output terminal of the power amplifier 11, and the other end of the filter 61 is connected to the antenna connection terminal 101. The filter 61 supports the predetermined power class. That is, the filter 61 has electric power handling capability corresponding to the predetermined power class. With this configuration, the filter circuit 60 can allow a transmission signal of band A amplified to output power higher than the first maximum output power by the power amplifier circuit 10 to pass through the filter circuit 60.

The filter 61 may be constituted by any one of a SAW (Surface Acoustic Wave) filter, a BAW (Bulk Acoustic Wave) filter, an LC resonance filter, and a dielectric filter. However, the filter 61 is not restricted to these types of filters.

The control circuit 70 is able to control the power amplifier circuit 10 and other elements. The control circuit 70 receives a digital control signal from the RFIC 3 via the control terminal 131 and outputs the control signal to the power amplifier circuit 10 or another element.

The circuit configuration of the radio-frequency circuit 1 illustrated in FIG. 1 is an example and the circuit configuration of the radio-frequency circuit 1 is not restricted thereto. For example, the provision of the control circuit 70 for the radio-frequency circuit 1 may be omitted. In this case, the control circuit 70 may be included in the RFIC 3, for example.

[1.2 Processing (Communication Method) of Communication Device 5]

An example of processing of the communication device 5 configured as described above will now be described below.

[1.2.1 Procedure of Processing]

Figure 2:
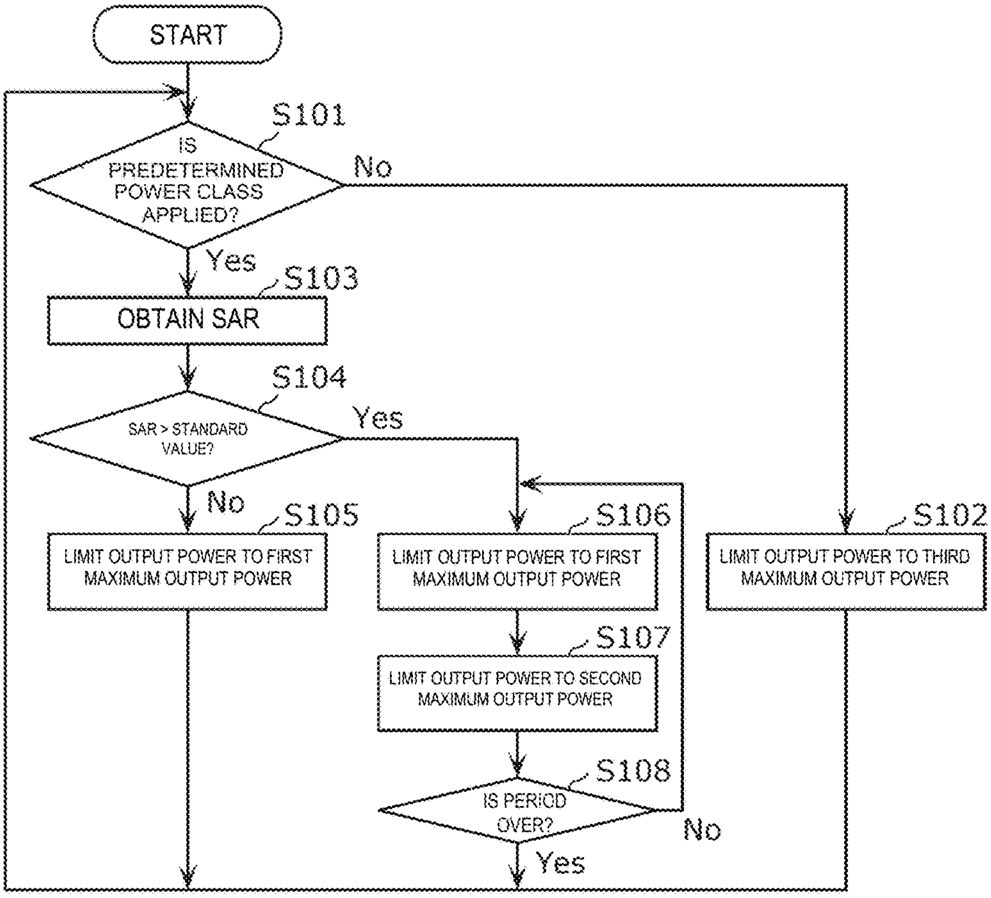
FIG. 2 is a flowchart illustrating processing of the communication device according to the first embodiment.

The procedure of processing of the communication device 5 will first be discussed below with reference to FIG. 2. FIG. 2 is a flowchart illustrating processing of the communication device 5 according to the first embodiment. The processing illustrated in FIG. 2 can be executed by the RFIC 3 or the control circuit 70.

First, it is determined whether the predetermined power class (power class 2, for example) is applied to the transmission of a signal of band A (S101). The power class to be applied to the transmission of a signal of band A is determined based on a signal received from a BS (Base Station), for example.

If it is not found that the predetermined power class is applied to the transmission of a signal of band A (No in S101), output power is limited to third maximum output power of a power class (23 dBm of power class 3, for example) different from the predetermine power class (S102). Then, the process returns to step S101. That is, the third maximum output power is determined to be the maximum output power that can be permitted for the transmission of a signal of band A (hereinafter such maximum output power will be called the permissible maximum output power). With this operation, the power amplifier circuit 10 amplifies a signal of band A so that the output power of the signal of band A does not exceed the third maximum output power.

In contrast, if it is determined that the predetermined power class is applied to the transmission of a signal of band A (Yes in S101), an SAR (Specific Absorption Rate), which is found at the time of the transmission of a signal of band A with the first maximum output power of the predetermined power class, is obtained (S103).

The SAR is an amount of energy which is absorbed by tissue of a human body per unit mass per unit time when the human body is exposed to radio waves. In the first embodiment, as the SAR, a local SAR is used. The local SAR is the average amount of energy per unit time which is absorbed by certain 10 grams of tissue for six minutes when a human body is exposed to radio waves. For example, the ordinance on specified radio equipment under the Radio Act of Japan defines that, when UE is used near the head of a user, the standard value of the local SAR is 2 W/kg.

The approach to obtaining the SAR is not restricted to a particular method. For example, the SAR value may be premeasured for each of the relative positions of UE to a user and be stored in a memory. In this case, the UE finds a certain relative position of the UE to the user so as to obtain the SAR corresponding to this relative position. The approach to finding a relative position of the UE to the user is not restricted to a particular method, and known art may be used.

Then, it is determined whether the obtained SAR exceeds a standard value (S104). As the standard value, the SAR value, which is typically accepted as the amount of radio wave radiating from UE that does not harm the human body, is used. In Japan, for example, 2 W/kg can be used as the standard value. As the standard value, the internationally common value may be used, or different values unique to individual countries may be used.

If it is determined that the obtained SAR does not exceed the standard value (No in S104), output power is limited to the first maximum output power (26 dBm of power class 2, for example) of the predetermined power class (S105). Then, the process returns to step S101. That is, the first maximum output power is determined to be the permissible maximum output power. With this operation, the power amplifier circuit 10 amplifies a signal of band A so that the output power of the signal of band A does not exceed the first maximum output power.

In contrast, if it is determined that the obtained SAR exceeds the standard value (Yes in S104), output power is limited to the first maximum output power of the predetermined power class (S106). Then, the output power is limited to second maximum output power (S107). The second maximum output power is lower than the first maximum output power and is also lower than the third maximum output power. For example, 0 mW may be set as the second maximum output power. In this case, the operation of the power amplifier circuit 10 may be stopped and the inputting of a radio-frequency signal may be prevented.

If a period for the application of the predetermined power class continues (No in S108), the process returns to step S106. If the period for the application of the predetermined power class is over (Yes in S108), the process returns to step S101. With this operation, the permissible maximum output power can be repeatedly switched between the first maximum output power and the second maximum output power. That is, the power amplifier circuit 10 repeats the amplifying of a signal of band A so that the output power of the signal of band A does not exceed the first maximum output power and the amplifying of a signal of band A so that the output power of the signal of band A does not exceed the second maximum output power.

The communication method illustrated in FIG. 2 is an example and the communication method is not restricted thereto. For example, the SAR is compared with the standard value in FIG. 2, but the use of the SAR is not essential. In one example, depending on the frequency, the input power density may be used instead of the SAR. In another example, steps S104 and S105 may be omitted. In this case, regardless of the value of SAR, steps S106 through S108 are executed.

[1.2.2 Transition of Permissible Maximum Output Power]

Figure 3:
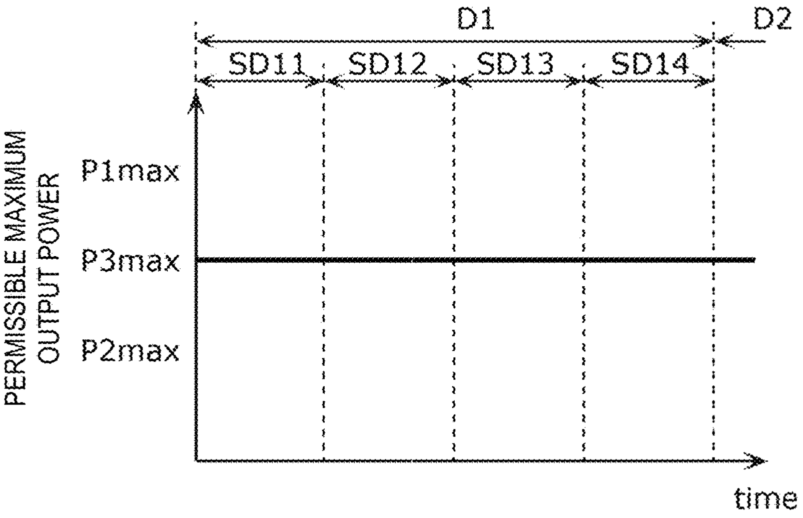
FIG. 3 is a graph illustrating permissible maximum output power with respect to time when step S102 in FIG. 2 is executed in the first embodiment.
Figure 4:
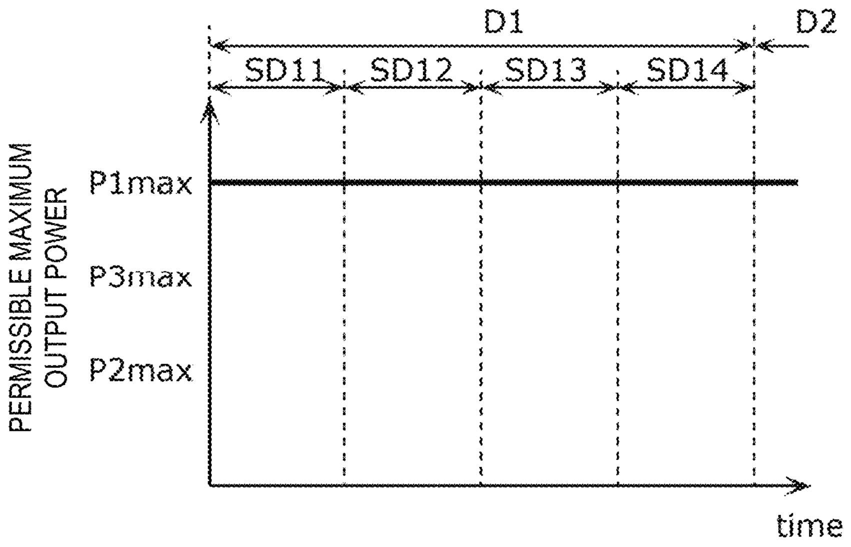
FIG. 4 is a graph illustrating permissible maximum output power with respect to time when step S105 in FIG. 2 is executed in the first embodiment.
Figure 5:
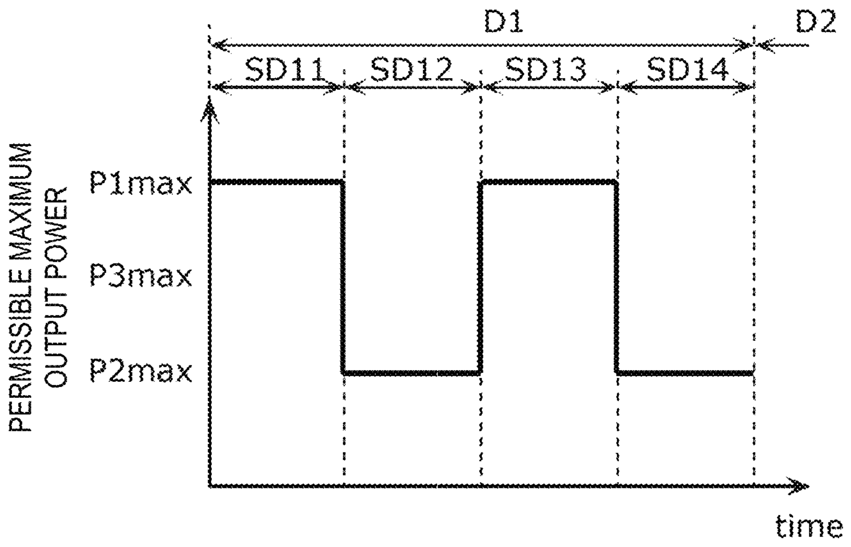
FIG. 5 is a graph illustrating permissible maximum output power with respect to time when steps S106 and S107 in FIG. 2 are executed in the first embodiment.

Examples of the transition of the permissible maximum output power based on the above-described processing will now be explained below with reference to the graphs of FIGS. 3 through 5. FIG. 3 is a graph illustrating the permissible maximum output power with respect to time when step S102 in FIG. 2 is executed in the first embodiment. FIG. 4 is a graph illustrating the permissible maximum output power with respect to time when step S105 in FIG. 2 is executed in the first embodiment. FIG. 5 is a graph illustrating the permissible maximum output power with respect to time when steps S106 and S107 in FIG. 2 are executed in the first embodiment.

In FIGS. 3 through 5, the vertical axis indicates the permissible maximum output power, while the horizontal axis indicates the time. On the top portion of each graph, a first period DI and a second period D2 corresponding to the time are indicated.

The first period D1 includes sub-periods SD11 through SD14 that do not overlap each other. In the first embodiment, the sub-periods SD11 through SD14 are examples of first through fourth sub-periods, respectively. The length of the sub-period SD11 is the same as that of the sub-period SD13. The length of the sub-period SD12 is the same as that of the sub-period SD14. That is, in the first period D1, the permissible maximum output power is periodically switched between the first maximum output power P1max and the second maximum output power P2max.

As the sub-periods SD11 through SD14, frames, for example, are used. In the first period D1, a frame group including multiple frames is used. The number of sub-periods included in the first period D1 is not limited to four. Each of the sub-periods SD11 through SD14 does not necessarily correspond to one frame. Each of the sub-periods SD11 through SD14 may correspond to multiple frames or at least one subframe.

A frame is a unit which forms a radio-frequency signal (modulated signal). For example, 5GNR and LTE define that a frame includes ten subframes, each subframe includes plural slots, and each slot is constituted by plural symbols. The subframe length is 1 ms, and the frame length is 10 ms.

In FIG. 3, a power class (power class 3, for example) different from the predetermined power class is applied to the transmission of a signal of band A. Output power is thus limited to the third maximum output power P3max in the first period D1. That is, in the sub-periods SD11 through SD14 of the first period D1, the permissible maximum output power is maintained at P3max. In this case, a third power supply voltage is supplied to the power amplifier circuit 10.

In FIG. 4, the predetermined power class (power class 2, for example) is applied to the transmission of a signal of band A. The SAR does not exceed the standard value, and output power is thus limited to the first maximum output power P1max in the first period D1. That is, in the sub-periods SD11 through SD14 of the first period D1, the permissible maximum output power is maintained at P1max. In this case, a first power supply voltage that is higher than the third power supply voltage is supplied to the power amplifier circuit 10.

In FIG. 5, the predetermined power class (power class 2, for example) is applied to the transmission of a signal of band A. The SAR exceeds the standard value, and the permissible maximum output power is thus switched between the first maximum output power P1max and the second maximum output power P2max in the first period D1. That is, in the first period D1, output power is limited to the first maximum output power P1max in the sub-periods SD11 and SD13, while output power is limited to the second maximum output power P2max in the sub-periods SD12 and SD14. In other words, in the first period DI, the permissible maximum output power is variable and the variable permissible maximum output power is switched between the first maximum output power P1max and the second maximum output power P2max. In this case, the first power supply voltage is supplied to the power amplifier circuit 10 in the sub-periods SD11 and SD13, while a second power supply voltage that is lower than the first power supply voltage is supplied to the power amplifier circuit 10 in the sub-periods SD12 and SD14.

If, in another period, such as the second period D2, the power class and the SAR are the same as those in the first period D1, the permissible maximum output power in this period is determined similarly to that in the first period D1. As a result, the average permissible maximum output power per unit time becomes uniform over multiple periods. In other words, the difference between the average permissible maximum output power per unit time in the first period D1 and that in the second period D2 becomes smaller than a predetermined threshold. As the predetermined threshold, a value representing that this difference is sufficiently small is used.

[1.3 Advantages of First Embodiment]

As described above, a radio-frequency circuit 1 according to the first embodiment includes a power amplifier circuit 10 and a filter circuit 60. The power amplifier circuit 10 supports a predetermined power class which allows for first maximum output power P1max, which is the maximum output power of power class 2 or higher. The filter circuit 60 is connected to the power amplifier circuit 10 and has a pass band including the uplink operating band of FDD band A. The predetermined power class is applied to the transmission of a signal of band A in a first period D1. The first period D1 includes sub-periods SD11 and SD12. (i) If an SAR, which is found at the time of the transmission of a signal of band A with the first maximum output power P1max in the first period D1, does not exceed a standard value, the power amplifier circuit 10 amplifies a signal of band A so that output power of the signal of band A is limited to the first maximum output power P1max in the sub-periods SD11 and SD12. (ii) If the SAR exceeds the standard value, the power amplifier circuit 10 amplifies a signal of band A so that output power of the signal of band A is limited to the first maximum output power P1max in the sub-period SD11 and so that output power of the signal of band A is limited to second maximum output power P2max in the sub-period SD12. The second maximum output power P2max is lower than the first maximum output power P1max.

With this configuration, if the SAR, which is found at the time of the transmission of a signal of FDD band A with the first maximum output power P1max in the first period D1, exceeds the standard value, as the permissible maximum output power for transmitting a signal of FDD band A, the first maximum output power P1max can be used in the sub-period SD11, while the second maximum output power P2max can be used in the sub-period SD12. Hence, in the first period D1, the SAR can be lowered compared with the configuration in which the permissible maximum output power is maintained at the first maximum output power P1max. As a result, the health of a user is less likely to be harmed when the predetermined power class that allows for maximum output power higher than before is applied to an FDD band.

Additionally, for example, in the radio-frequency circuit 1 according to the first embodiment, the first period D1 may include sub-periods SD13 and SD14 which follow the sub-periods SD11 and SD12. (i) If the SAR does not exceed the standard value, the power amplifier circuit 10 may amplify a signal of band A so that output power of the signal of band A is limited to the first maximum output power P1max in the sub-periods SD11 through SD14. (ii) If the SAR exceeds the standard value, the power amplifier circuit 10 may amplify a signal of band A so that output power of the signal of band A is limited to the first maximum output power P1max in the sub-periods SD11 and SD13 and so that output power of the signal of band A is limited to the second maximum output power P2max in the sub-periods SD12 and SD14.

With this configuration, as the permissible maximum output power, the first maximum output power P1max and the second maximum output power P2max can be repeatedly used. It is thus possible to lower the SAR and also to increase the number of sub-periods for which the first maximum output power P1max can be used as the permissible maximum output power, thereby reducing the degradation of the transmission performance.

Additionally, for example, in the radio-frequency circuit 1 according to the first embodiment, the length of the sub-period SD11 may be identical to the length of the sub-period SD13, while the length of the sub-period SD12 may be identical to the length of the sub-period SD14.

With this configuration, the permissible maximum output power can be periodically switched between the first maximum output power P1max and the second maximum output power P2max. It is thus possible to lower the SAR and also to increase the time for which the first maximum output power P1max can be used as the permissible maximum output power, thereby reducing the degradation of the transmission performance.

Moreover, for example, in the radio-frequency circuit 1 according to the first embodiment, the predetermined power class may be applied to the transmission of a signal of band A in a second period D2 which follows the first period D1. The power amplifier circuit 10 may amplify a signal of band A so that the difference between the average of maximum output power per unit time which is permitted for transmitting the signal of band A in the first period D1 and the average of maximum output power per unit time which is permitted for transmitting the signal of band A in the second period D2 becomes smaller than a predetermined threshold.

With this configuration, the average permissible maximum output power per unit time can become uniform over different multiple periods to which the predetermined power class is applied. This can reduce variations in the SAR over multiple periods, thereby making it less likely to harm the health of a user.

Moreover, for example, in the radio-frequency circuit 1 according to the first embodiment, the second maximum output power P2max may be lower than third maximum output power P3max of power class 3.

With this configuration, since output power lower than the third maximum output power P3max of power class 3 is used as the second maximum output power P2max, the SAR can be further reduced.

Furthermore, for example, in the radio-frequency circuit 1 according to the first embodiment, (i) if the SAR does not exceed the standard value, the power amplifier circuit 10 may amplify a signal of band A by using a first power supply voltage in the first period D1, and (ii) if the SAR exceeds the standard value, the power amplifier circuit 10 may amplify a signal of band A by using the first power supply voltage in the sub-period SD11 and amplify the signal of band A by using a second power supply voltage, which is lower than the first power supply voltage, in the sub-period SD12.

With this configuration, it is possible to change the power supply voltage to be used in the power amplifier circuit 10 in accordance with the permissible maximum output power, thereby reducing power consumption for power amplification.

From a different point of view, the radio-frequency circuit 1 according to the first embodiment is the following radio-frequency circuit. The radio-frequency circuit 1 includes a power amplifier circuit 10 and a filter circuit 60. The power amplifier circuit 10 supports a predetermined power class which allows for first maximum output power P1max, which is the maximum output power of power class 2 or higher. The filter circuit 60 is connected to the power amplifier circuit 10 and has a pass band including the uplink operating band of FDD band A. If the predetermined power class is applied to the transmission of a signal of band A, the power amplifier circuit 10 amplifies a signal of band A so that output power of the signal of band A is limited to variable maximum output power. The variable maximum output power is repeatedly switched between the first maximum output power P1max and second maximum output power P2max, which is lower than the first maximum output power P1max.

With this configuration, as the permissible maximum output power for transmitting a signal of FDD band A, the first maximum output power P1max and the second maximum output power P2max can be repeatedly switched therebetween. This can reduce the time for a user to be exposed to strong radio frequencies compared with the configuration in which the permissible maximum output power is maintained at the first maximum output power P1max. As a result, the health of a user is less likely to be harmed when the predetermined power class that allows for maximum output power higher than before is applied to an FDD band.

Furthermore, for example, in the radio-frequency circuit 1 according to the first embodiment, the variable maximum output power may be periodically switched between the first maximum output power P1max and the second maximum output power P2max.

With this configuration, as the permissible maximum output power, the first maximum output power P1max and the second maximum output power P2max can be periodically switched therebetween. It is thus possible to make it less likely to harm the health of a user and also to increase the time for which the first maximum output power P1max can be used as the permissible maximum output power, thereby reducing the degradation of the transmission performance.

A communication device 5 according to the first embodiment includes an RFIC 3 that processes a radio-frequency signal and the radio-frequency circuit 1 that transfers the radio-frequency signal between the RFIC 3 and the antenna 2.

With this configuration, the advantages of the radio-frequency circuit 1 can be implemented by the communication device 5.

A communication method according to the first embodiment includes: if a predetermined power class is applied to the transmission of a signal of band A in a first period D1 including sub-periods SD11 and SD12 (Yes in S101), the predetermined power class allowing for first maximum output power P1max, the first maximum output power P1max being maximum output power of power class 2 or higher, (i) limiting output power of a signal of band A to the first maximum output power P1max in the sub-periods SD11 and SD12 (S105) if an SAR, which is found at the time of the transmission of a signal of band A with the first maximum output power P1max in the first period D1, does not exceed a standard value (No in S104); and (ii) limiting output power of a signal of band A to the first maximum output power P1max in the sub-period SD11 (S106) and limiting output power of the signal of band A to second maximum output power P2max, which is lower than the first maximum output power P1max, in the sub-period SD12 (S107) if the SAR exceeds the standard value (Yes in S104).

From a different point of view, the communication method according to the first embodiment includes: if a predetermined power class is applied to the transmission of a signal of band A, the predetermined power class allowing for first maximum output power, the first maximum output power being maximum output power of power class 2 or higher, limiting output power of a signal of band A to variable maximum output power; and repeatedly switching the variable maximum output power between the first maximum output power P1max and second maximum output power P2max, which is lower than the first maximum output power P1max (S106 through S108).

With this configuration, as the permissible maximum output power for transmitting a signal of FDD band A, the first maximum output power P1max and the second maximum output power P2max can be used. This can reduce the time for a user to be exposed to strong radio frequencies compared with the configuration in which the permissible maximum output power is maintained at the first maximum output power P1max. As a result, the health of a user is less likely to be harmed when the predetermined power class that allows for maximum output power higher than before is applied to an FDD band.

(First Modified Example of First Embodiment)

A first modified example of the first embodiment will be described below. The first modified example is different from the first embodiment mainly in that two power amplifiers connected in parallel with each other are used. Hereinafter, the first modified example will be explained with reference to the drawing by mainly referring to points different from the first embodiment.

[1.4 Circuit Configuration of Radio-Frequency Circuit 1A]

Figure 6:
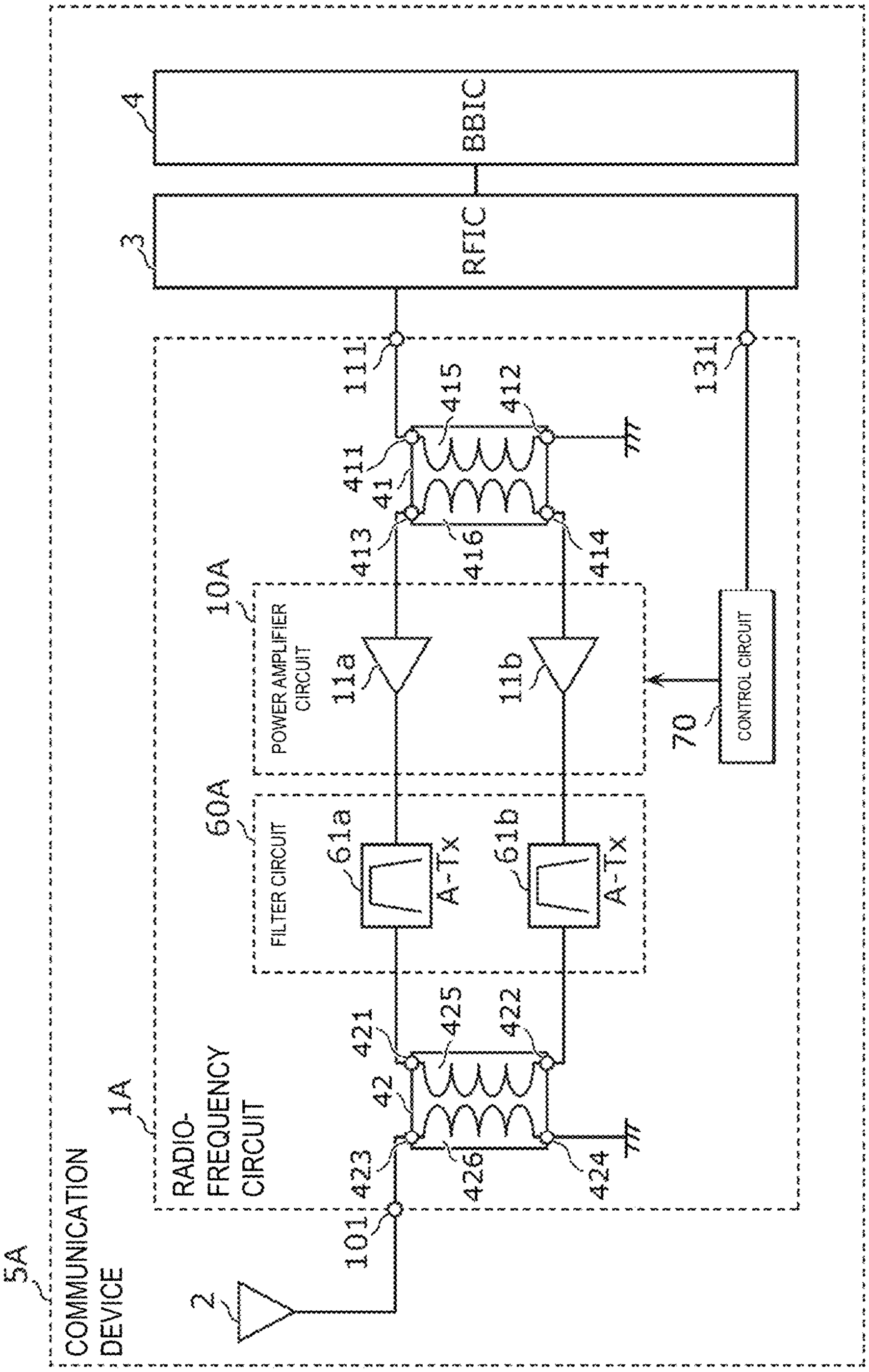
FIG. 6 is a circuit diagram of a radio-frequency circuit and a communication device according to a first modified example of the first embodiment.

A radio-frequency circuit 1A according to the first modified example will be described below with reference to FIG. 6. FIG. 6 is a circuit diagram of the radio-frequency circuit 1A and a communication device 5A according to the first modified example.

The circuit configuration of the communication device 5A is similar to that of the communication device 5 of the first embodiment, except that the communication device 5A includes the radio-frequency circuit 1A instead of the radio-frequency circuit 1, and an explanation thereof will thus be omitted.

The radio-frequency circuit 1A includes a power amplifier circuit 10A, transformers 41 and 42, a filter circuit 60A, a control circuit 70, an antenna connection terminal 101, a radio-frequency input terminal 111, and a control terminal 131.

The power amplifier circuit 10A is connected between the radio-frequency input terminal 111 and the filter circuit 60A and is able to amplify a transmission signal of band A by using a power supply voltage supplied from the outside of the radio-frequency circuit 1A. The power amplifier circuit 10A supports the predetermined power class that allows for the first maximum output power, which is the maximum output power of power class 2 or higher. In the first modified example, the power amplifier circuit 10A includes power amplifiers 11*a* and 11*b* connected in parallel with each other.

The power amplifier 11*a* is an example of a first power amplifier and is able to amplify one of two signals divided by the transformer 41. The power amplifier 11*a* alone does not support the predetermined power class. That is, the power amplifier 11*a* is unable to amplify a transmission signal of band A up to power higher than the first maximum output power of the predetermined power class.

The power amplifier 11*b* is an example of a second power amplifier and is able to amplify the other one of the two signals divided by the transformer 41. The power amplifier 11*b* alone does not support the predetermined power class. That is, the power amplifier 11*b* is unable to amplify a transmission signal of band A up to power higher than the first maximum output power of the predetermined power class.

In this manner, in the first modified example, neither of the power amplifiers 11*a* and 11*b* supports the predetermined power class by itself. Combining two signals amplified by the two power amplifiers 11*a* and 11*b* can amplify a transmission signal of band A up to power higher than the first maximum output power of the predetermined power class.

The transformer 41 serves as a divider and can divide one signal into two signals in opposite phase. The transformer 41 includes an input terminal 411, a ground terminal 412, output terminals 413 and 414, a primary coil 415, and a secondary coil 416.

The input terminal 411 forms one end of the primary coil 415. The input terminal 411 is connected to the radio-frequency input terminal 111.

The ground terminal 412 forms the other end of the primary coil 415. The ground terminal 412 is connected to a ground.

The output terminal 413 forms one end of the secondary coil 416. The output terminal 413 is connected to the input terminal of the power amplifier 11*a*.

The output terminal 414 forms the other end of the secondary coil 416. The output terminal 414 is connected to the input terminal of the power amplifier 11*b*.

The transformer 42 is an example of a combiner and can combine two signals in opposite phase with each other. The transformer 42 includes input terminals 421 and 422, an output terminal 423, a ground terminal 424, a primary coil 425, and a secondary coil 426.

The input terminal 421 is an example of a first input terminal and forms one end of the primary coil 425. The input terminal 421 is connected to the output terminal of the power amplifier 11*a* via the filter 61*a*.

The input terminal 422 is an example of a second input terminal and forms the other end of the primary coil 425. The input terminal 422 is connected to the output terminal of the power amplifier 11*b* via the filter 61*b*.

The output terminal 423 forms one end of the secondary coil 426. The output terminal 423 is connected to the antenna connection terminal 101.

The ground terminal 424 forms the other end of the secondary coil 426. The ground terminal 424 is connected to a ground.

In the first modified example, the transformer 42 is used as a combiner, but the combiner is not restricted thereto. For example, a Wilkinson power combiner may be used as the combiner.

The filter circuit 60A is an example of the first filter circuit and has a pass band including the uplink operating band of band A. The filter circuit 60A is connected between the antenna connection terminal 101 and the power amplifier circuit 10A. In the first modified example, the filter circuit 60A includes filters 61*a* and 61*b* each having a pass band including the uplink operating band of band A.

The filter 61*a* is an example of a first filter and is connected between the output terminal of the power amplifier 11*a* and the input terminal 421 of the transformer 42. More specifically, one end of the filter 61*a* is connected to the output terminal of the power amplifier 11*a*, and the other end of the filter 61*a* is connected to the input terminal 421 of the transformer 42.

The filter 61*b* is an example of a second filter and is connected between the output terminal of the power amplifier 11*b* and the input terminal 422 of the transformer 42. More specifically, one end of the filter 61*b* is connected to the output terminal of the power amplifier 11*b*, and the other end of the filter 61*b* is connected to the input terminal 422 of the transformer 42.

The circuit configuration of the radio-frequency circuit 1A shown in FIG. 6 is an example and the circuit configuration of the radio-frequency circuit 1A is not restricted thereto. For example, the provision of the transformer 41 for the radio-frequency circuit 1A may be omitted. In this case, two radio-frequency signals of band A having adjusted phases may be supplied from the RFIC 3 to the radio-frequency circuit 1A. Additionally, the provision of the control circuit 70 for the radio-frequency circuit 1A may be omitted. In this case, the control circuit 70 may be included in the RFIC 3, for example.

The power amplifier circuit 10A may be a multistage amplifier circuit. If this is the case, as a power amplifier serving as an input stage, the power amplifier circuit 10A may include two power amplifiers connected to the input terminals of the power amplifiers 11*a* and 11*b*. Alternatively, as a power amplifier serving as the input stage, the power amplifier circuit 10A may include one power amplifier connected to the input terminals of the power amplifiers 11*a* and 11*b*. In this case, this power amplifier may be connected between the input terminal 411 of the transformer 41 and the radio-frequency input terminal 111.

[1.5 Advantages of First Modified Example of First Embodiment]

As described above, a radio-frequency circuit 1A according to the first modified example further includes a transformer 42. The transformer 42 includes input terminals 421 and 422 and an output terminal 423 which is connected to the antenna connection terminal 101. A power amplifier circuit 10A includes power amplifiers 11*a* and 11*b*. A filter circuit 60A includes filters 61*a* and 61*b*. The filter 61*a* has a pass band including the uplink operating band of band A and is connected between the power amplifier 11*a* and the input terminal 421 of the transformer 42. The filter 61*b* has a pass band including the uplink operating band of band A and is connected between the power amplifier 11*b* and the input terminal 422 of the transformer 42. With this configuration, it is possible to amplify a transmission signal up to output power higher than the first maximum output power P1max by using the two power amplifiers 11*a* and 11*b* connected in parallel with each other. That is, even though neither of the power amplifiers 11*a* and 11*b* is able to amplify a transmission signal up to output power higher than the first maximum output power P1max by itself, high output power can be implemented. Moreover, the use of the two parallel-connected filters 61*a* and 61*b* can spare electric power handling capability of each of the filters 61*a* and 61*b*.

(Second Modified Example of First Embodiment)

A second modified example of the first embodiment will be described below. The second modified example is different from the first modified example mainly in that a signal of band A is output from two antennas. Hereinafter, the second modified example will be explained with reference to the drawing by mainly referring to points different from the first modified example.

Figure 7:
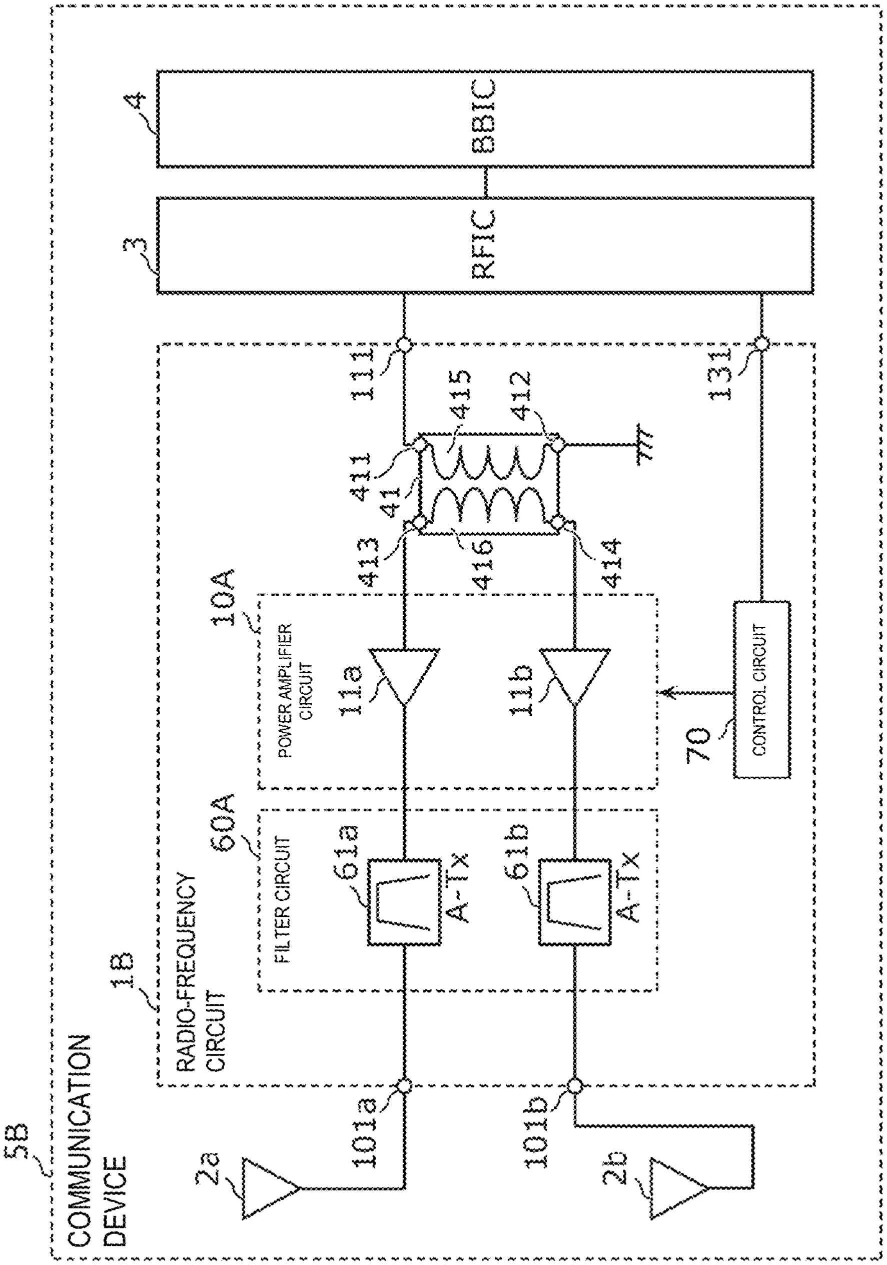
FIG. 7 is a circuit diagram of a radio-frequency circuit and a communication device according to a second modified example of the first embodiment.

[1.6 Circuit Configuration of Radio-Frequency Circuit 1B and Communication Device 5B]The circuit configurations of a radio-frequency circuit 1B and a communication device 5B including the radio-frequency circuit 1B according to the second modified example will be described below with reference to FIG. 7. FIG. 7 is a circuit diagram of the radio-frequency circuit 1B and the communication device 5B according to the second modified example.

The communication device 5B is similar to the communication device 5A according to the first modified example of the first embodiment, except that the communication device 5B includes antennas 2*a* and 2*b* instead of the antenna 2 and includes the radio-frequency circuit 1B instead of the radio-frequency circuit 1A. The antennas 2*a* and 2*b* and the radio-frequency circuit 1B will thus be explained below.

The antenna 2*a* is connected to an antenna connection terminal 101*a* of the radio-frequency circuit 1B. The antenna 2*a* receives a radio-frequency signal from the radio-frequency circuit 1B and outputs the radio-frequency signal to the outside of the radio-frequency circuit 1B.

The antenna 2*b* is connected to an antenna connection terminal 101*b* of the radio-frequency circuit 1B. The antenna 2*b* receives a radio-frequency signal from the radio-frequency circuit 1B and outputs the radio-frequency signal to the outside of the radio-frequency circuit 1B.

The radio-frequency circuit 1B includes a power amplifier circuit 10A, a transformer 41, a filter circuit 60A, a control circuit 70, antenna connection terminals 101*a* and 101*b*, a radio-frequency input terminal 111, and a control terminal 131.

The antenna connection terminal 101*a* is an example of a first antenna connection terminal and is connected to the antenna 2*a* at the outside of the radio-frequency circuit 1B. The antenna connection terminal 101*b* is an example of a second antenna connection terminal and is connected to the antenna 2*b* at the outside of the radio-frequency circuit 1B.

A filter 61*a* is an example of the first filter and is connected between the output terminal of the power amplifier 11*a* and the antenna connection terminal 101*a*. More specifically, one end of the filter 61*a* is connected to the output terminal of the power amplifier 11*a*, and the other end of the filter 61*a* is connected to the antenna connection terminal 101*a*.

A filter 61*b* is an example of the second filter and is connected between the output terminal of the power amplifier 11*b* and the antenna connection terminal 101*b*. More specifically, one end of the filter 61*b* is connected to the output terminal of the power amplifier 11*b*, and the other end of the filter 61*b* is connected to the antenna connection terminal 101*b*.

The circuit configuration of the radio-frequency circuit 1B shown in FIG. 7 is an example and the circuit configuration of the radio-frequency circuit 1B is not restricted thereto. For example, the provision of the transformer 41 for the radio-frequency circuit 1B may be omitted. Additionally, the provision of the control circuit 70 for the radio-frequency circuit 1B may be omitted. In this case, the control circuit 70 may be included in the RFIC 3, for example.

[1.7 Advantages of Second Modified Example of First Embodiment]

As described above, in a radio-frequency circuit 1B according to the second modified example, the power amplifier circuit 10A includes power amplifiers 11*a* and 11*b*, and the filter circuit 60A includes filters 61*a* and 61*b*. The filter 61*a* has a pass band including the uplink operating band of band A and is connected between the power amplifier 11*a* and an antenna connection terminal 101*a*. The filter 61*b* has a pass band including the uplink operating band of band A and is connected between the power amplifier 11*b* and an antenna connection terminal 101*b*.

With this configuration, it is possible to amplify a transmission signal up to output power higher than the first maximum output power P1max by using the two power amplifiers 11*a* and 11*b* connected in parallel with each other. That is, even though neither of the power amplifiers 11*a* and 11*b* is able to amplify a transmission signal up to output power higher than the first maximum output power P1max by itself, high output power can be implemented.

Moreover, the use of the two parallel-connected filters 61*a* and 61*b* can spare electric power handling capability of each of the filters 61*a* and 61*b*. Since the radio-frequency circuit 1B does not include the transformer 42, which serves as a combiner, the number of components can be reduced.

(Second Embodiment)

A second embodiment will now be described below. The second embodiment is different from the first embodiment mainly in that TDD (Time Division Duplex) band B as well as FDD band A is supported. Hereinafter, the second embodiment will be discussed below with

[2.1 Circuit Configuration of Radio-Frequency Circuit 1C]

Figure 8:
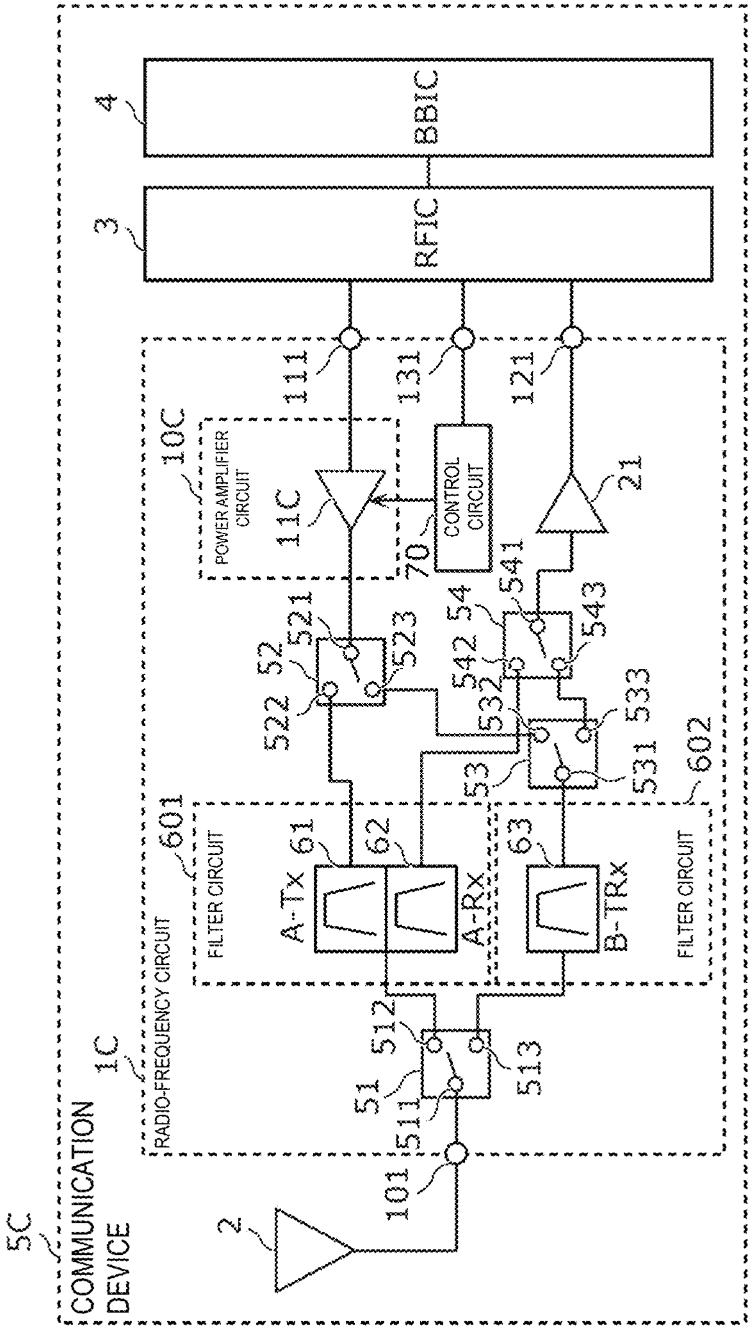
FIG. 8 is a circuit diagram of a radio-frequency circuit and a communication device according to a second embodiment.

A radio-frequency circuit 1C according to the second embodiment will be described below with reference to FIG. 8. FIG. 8 is a circuit diagram of the radio-frequency circuit 1C and a communication device 5C according to the second embodiment.

The circuit configuration of the communication device 5C is similar to that of the communication device 5 of the first embodiment, except that the communication device 5C includes the radio-frequency circuit 1C instead of the radio-frequency circuit 1, and an explanation thereof will thus be omitted.

The radio-frequency circuit 1C includes a power amplifier circuit 10C, a low-noise amplifier 21, switches 51 through 54, filter circuits 601 and 602, a control circuit 70, an antenna connection terminal 101, a radio-frequency input terminal 111, a radio-frequency output terminal 121, and a control terminal 131.

The radio-frequency input terminal 111 is an input terminal for receiving a transmission signal of FDD band A and a transmission signal of TDD band B from the outside of the radio-frequency circuit IC. In the second embodiment, the radio-frequency input terminal 111 is connected to the RFIC 3 at the outside the radio-frequency circuit IC.

The radio-frequency output terminal 121 is an output terminal for supplying a reception signal of FDD band A and a reception signal of TDD band B to the outside of the radio-frequency circuit 1C. In the second embodiment, the radio-frequency output terminal 121 is connected to the RFIC 3 at the outside the radio-frequency circuit IC.

The power amplifier circuit 10C is connected between the radio-frequency input terminal 111 and the filter circuits 601 and 602 and is able to amplify a transmission signal of band A and a transmission signal of band B by using a power supply voltage supplied from the outside of the radio-frequency circuit IC. The power amplifier circuit 10C supports the predetermined power class that allows for the first maximum output power, which is the maximum output power of power class 2 or higher.

In the second embodiment, the power amplifier circuit 10C includes a power amplifier 11C. The power amplifier 11C supports the predetermined power class. That is, the power amplifier 11C is able to amplify a transmission signal of band A and a transmission signal of band B up to power higher than the first maximum output power of the predetermined power class.

The low-noise amplifier 21 is connected between the filter circuits 601 and 602 and the radio-frequency output terminal 121 and is able to amplify a reception signal of band A and a reception signal of band B by using a power supply voltage supplied from the outside of the radio-frequency circuit 1C.

The filter circuit 601 is an example of the first filter circuit and allows a transmission signal and a reception signal of FDD band A to pass therethrough. The filter circuit 601 includes filters 61 and 62.

The filter 61 has a pass band including the uplink operating band of band A and is connected between the antenna connection terminal 101 and the power amplifier circuit 10C. More specifically, one end of the filter 61 is connected to the output terminal of the power amplifier 11C via the switch 52, and the other end of the filter 61 is connected to the antenna connection terminal 101 via the switch 51. The filter 61 supports the predetermined power class. That is, the filter 61 has electric power handling capability corresponding to the predetermined power class. With this configuration, the filter circuit 601 can allow a transmission signal of band A amplified to output power higher than the first maximum output power by the power amplifier circuit 10C to pass through the filter circuit 601.

The filter 62 has a pass band including the downlink operating band of band A and is connected between the antenna connection terminal 101 and the low-noise amplifier 21. More specifically, one end of the filter 62 is connected to the antenna connection terminal 101 via the switch 51, and the other end of the filter 62 is connected to the input terminal of the low-noise amplifier 21 via the switch 54.

The filter circuit 602 is an example of a second filter circuit and allows a transmission signal and a reception signal of TDD band B to pass therethrough. The filter circuit 602 includes a filter 63.

The filter 63 has a pass band including band B and is connected between the antenna connection terminal 101 and each of the power amplifier circuit 10C and the low-noise amplifier 21. More specifically, one end of the filter 63 is connected to the antenna connection terminal 101 via the switch 51, and the other end of the filter 63 is connected to the output terminal of the power amplifier 11C via the switches 53 and 52 and also to the input terminal of the low-noise amplifier 21 via the switches 53 and 54. The filter 63 supports the predetermined power class. That is, the filter 63 has electric power handling capability corresponding to the predetermined power class. With this configuration, the filter circuit 602 can allow a transmission signal of band B amplified to output power higher than the first maximum output power by the power amplifier circuit 10C to pass through the filter circuit 602.

The switch 51 is connected between the antenna connection terminal 101 and the filter circuits 601 and 602. The switch 51 has terminals 511 through 513. The terminal 511 is connected to the antenna connection terminal 101. The terminal 512 is connected to the filter circuit 601. The terminal 513 is connected to the filter circuit 602.

With this connection configuration, the switch 51 can connect the terminal 511 to one of the terminals 512 and 513, based on a control signal from the RFIC 3, for example. That is, the switch 51 can selectively connect the antenna connection terminal 101 to the filter circuit 601 or to the filter circuit 602. The switch 51 is constituted by an SPDT (Single-Pole Double-Throw) switch circuit, for example.

The switch 52 is connected between the power amplifier circuit 10C and the filters 61 and 63. The switch 52 has terminals 521 through 523. The terminal 521 is connected to the power amplifier circuit 10C. The terminal 522 is connected to the filter 61. The terminal 523 is connected to the filter 63 via the switch 53.

With this connection configuration, the switch 52 can connect the terminal 521 to one of the terminals 522 and 523, based on a control signal from the RFIC 3, for example. That is, the switch 52 can selectively connect the power amplifier circuit 10C to the filter 61 or to the filter 63. The switch 52 is constituted by an SPDT switch circuit, for example.

The switch 53 is connected between the filter 63 and each of the power amplifier circuit 10C and the low-noise amplifier 21. The switch 53 has terminals 531 through 533. The terminal 531 is connected to the filter 63. The terminal 532 is connected to the output terminal of the power amplifier 11C via the switch 52. More specifically, the terminal 532 is connected to the terminal 523 of the switch 52. The terminal 533 is connected to the input terminal of the low-noise amplifier 21 via the switch 54. More specifically, the terminal 533 is connected to a terminal 543 of the switch 54.

With this connection configuration, the switch 53 can connect the terminal 531 to one of the terminals 532 and 533, based on a control signal from the RFIC 3, for example. That is, the switch 53 can selectively connect the filter 63 to the power amplifier 11C or to the low-noise amplifier 21. The switch 53 is constituted by an SPDT switch circuit, for example.

The switch 54 is connected between the low-noise amplifier 21 and the filters 62 and 63. The switch 54 has terminals 541 through 543. The terminal 541 is connected to the input terminal of the low-noise amplifier 21. The terminal 542 is connected to the filter 62. The terminal 543 is connected to the filter 63 via the switch 53.

With this connection configuration, the switch 54 can connect the terminal 541 to one of the terminals 542 and 543, based on a control signal from the RFIC 3, for example. That is, the switch 54 can selectively connect the low-noise amplifier 21 to the filter 62 or to the filter 63. The switch 54 is constituted by an SPDT switch circuit, for example.

The circuit configuration of the radio-frequency circuit 1C shown in FIG. 8 is an example and the circuit configuration of the radio-frequency circuit 1C is not restricted thereto. For example, the low-noise amplifier 21 is used for both band A and band B, but the radio-frequency circuit 1C may include two low-noise amplifiers individually used for band A and band B. In this case, one of the two low-noise amplifiers is connected to the filter 62, and the other one of the two low-noise amplifiers is connected to the filter 63.

[2.2 Processing of Communication Device 5C]

An example of processing of the communication device 5C configured as described above will now be described below.

[2.2.1 Procedure of Processing]

Figure 9:
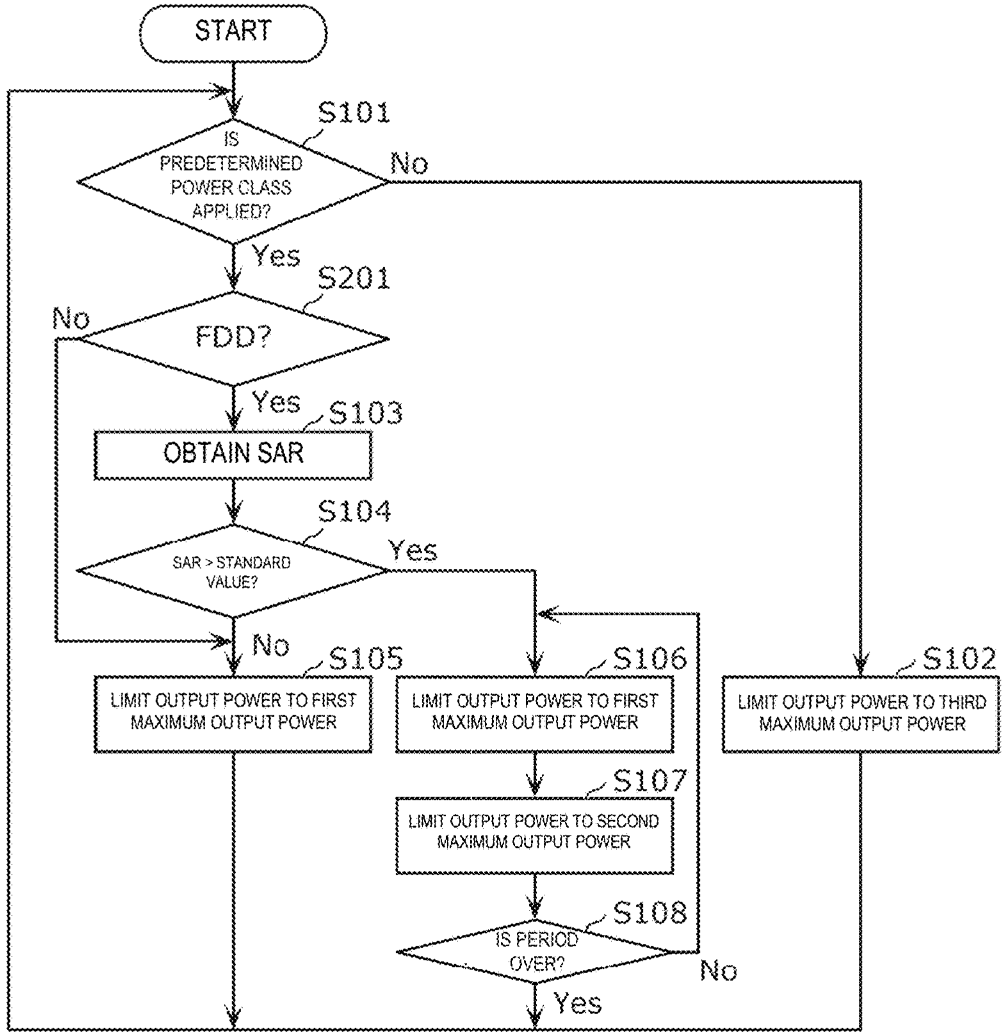
FIG. 9 is a flowchart illustrating processing of the communication device according to the second embodiment.

The procedure of processing of the communication device 5C will first be discussed below with reference to FIG. 9. FIG. 9 is a flowchart illustrating processing of the communication device 5C according to the second embodiment. The processing illustrated in FIG. 9 can be executed by the RFIC 3 or the control circuit 70.

First, it is determined whether the predetermined power class (power class 2, for example) is applied to the transmission of a signal of band A or band B (S101). The power class to be applied to the transmission of a signal of band A and a signal of band B is determined based on a signal received from a BS (Base Station), for example.

If it is determined that the predetermined power class is applied to the transmission of a signal of band A or band B (Yes in S101), it is determined whether FDD is applied (S201). That is, it is determined whether FDD or TDD is used for transmission. More specifically, it is determined whether FDD band A or TDD band B is used for transmission.

If it is determined that FDD is applied (Yes in S201), step S103 and the subsequent steps are executed similarly to the first embodiment. That is, if the predetermined power class is applied to the transmission of a signal of FDD band A, step S103 and the subsequent steps are executed.

If it is determined that FDD is not applied (No in S201), steps S103 and S104 are skipped, and output power is limited to the first maximum output power (26 dBm of power class 2, for example) of the predetermined power class (S105). That is, if the predetermined power class is applied to the transmission of a signal of TDD band B, the permissible maximum output power is fixed to the first maximum output power.

[2.2.2 Transition of Permissible Maximum Output Power]

Figure 10:
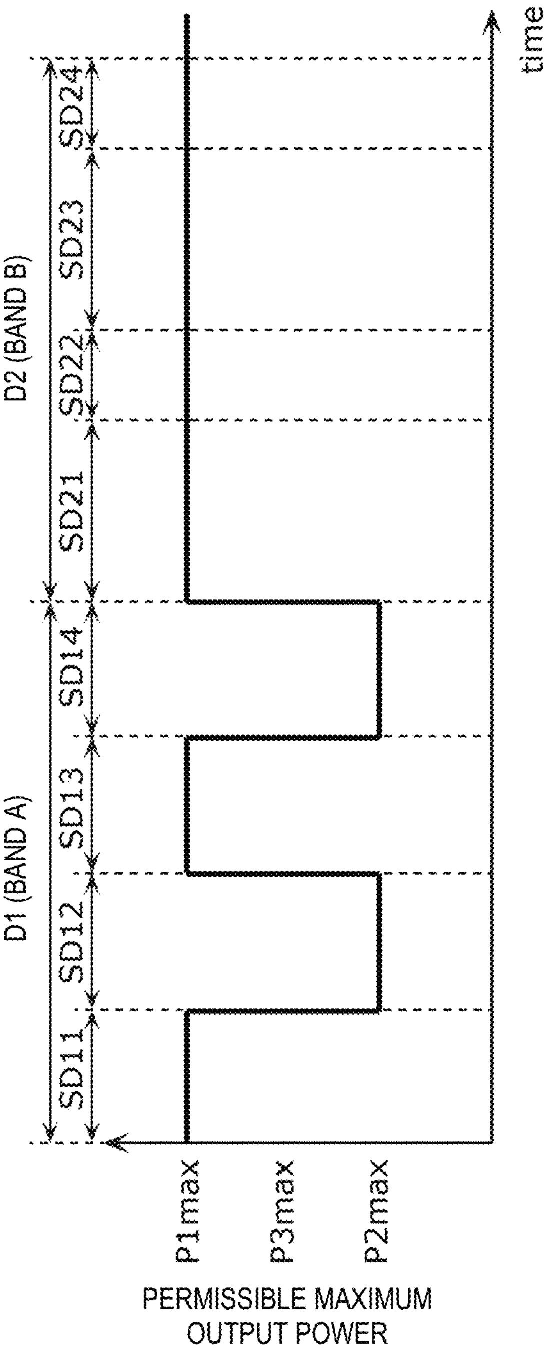
FIG. 10 is a graph illustrating permissible maximum output power with respect to time in the second embodiment.

An example of the transition of the permissible maximum output power will now be explained below with reference to FIG. 10. FIG. 10 is a graph illustrating the permissible maximum output power with respect to time in the second embodiment.

In FIG. 10, the vertical axis indicates the permissible maximum output power, while the horizontal axis indicates the time. On the top portion of the graph, a first period D1 and a second period D2 corresponding to the time are indicated. The first period D1 includes sub-periods SD11 through SD14 that do not overlap each other. The second period D2 includes sub-periods SD21 through SD24 that do not overlap each other. In the second embodiment, the sub-periods SD11 and SD12 are examples of the first and second sub-periods, respectively, and the sub-periods SD21 and SD22 are examples of the third and fourth sub-periods, respectively.

In the first period D1, a signal of band A is transmitted and the predetermined power class (power class 2, for example) is applied to the transmission of a signal of band A. In the first period D1, the SAR exceeds the standard value.

Hence, as in the case of FIG. 5, the permissible maximum output power is switched between the first maximum output power P1max and the second maximum output power P2max in the first period D1. That is, in the first period D1, the permissible maximum output power is variable and the variable permissible maximum output power is switched between the first maximum output power P1max and the second maximum output power P2max. More specifically, within the first period D1, output power is limited to the first maximum output power P1max in the sub-periods SD11 and SD13, while output power is limited to the second maximum output power P2max in the sub-periods SD12 and SD14.

In the second period D2, a signal of band B is transmitted and the predetermined power class is applied to the transmission of a signal of band B.

Accordingly, step S105 in FIG. 9 is executed, and output power is limited to the first maximum output power P1max in the second period D2. That is, in the sub-periods SD21 through SD24 of the second period D2, the permissible maximum output power is maintained at P1max.

[2.3 Advantages of Second Embodiment]

As described above, a radio-frequency circuit 1C according to the second embodiment further includes a filter circuit 602 that is connected to the power amplifier circuit 10C and that has a pass band including TDD band B. The predetermined power class is also applied to the transmission of a signal of band B in a second period D2. The second period D2 includes sub-periods SD21 and SD22. The power amplifier circuit 10C amplifies a signal of band B so that output power of the signal of band B is limited to the first maximum output power P1max in the sub-periods SD21 and SD22.

With this configuration, for transmitting a signal of TDD band B, the first maximum output power P1max can be used as the permissible maximum output power in the sub-periods SD21 and SD22. Transmission of a signal of a TDD band and reception of a signal of the TDD band are switched therebetween in a time division manner. The time for which a user is exposed to a transmission signal of the TDD band is thus shorter than that for a transmission signal of the FDD band. Hence, even though the first maximum output power P1max is continuously used as the permissible maximum output power of a signal of TDD band B, the health of a user is less likely to be harmed than when the first maximum output power P1max is used for a signal of FDD band A. Using the first maximum output power P1max as the permissible maximum output power to transmit a signal of TDD band B in the sub-periods SD21 and SD22 can prioritize the transmission performance in TDD band B.

(Modified Example of Second Embodiment)

A modified example of the second embodiment will now be described below. The modified example is different from the second embodiment mainly in that the permissible maximum output power is switched also for the transmission of a signal of TDD band B. Hereinafter, the modified example will be explained with reference to the drawings by mainly referring to points different from the second embodiment.

The circuit configurations of a communication device 5C and a radio-frequency circuit 1C according to the modified example are similar to those of the second embodiment, and illustration and an explanation thereof are omitted.

[2.4 Processing of Communication Device 5C]

An example of processing of the communication device 5C according to the modified example will now be described below.

[2.4.1 Procedure of Processing]

Figure 11:
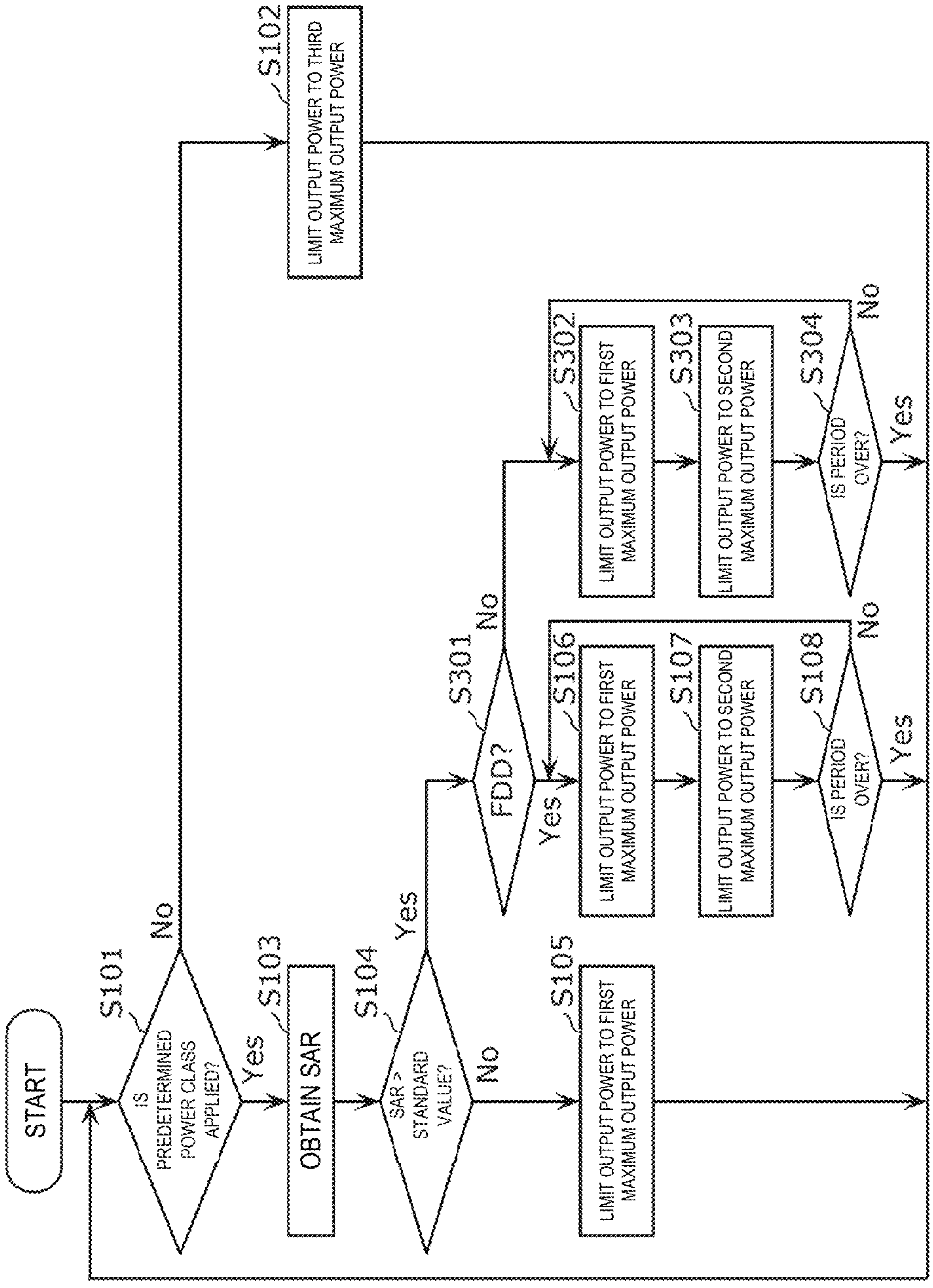
FIG. 11 is a flowchart illustrating processing of a communication device according to a modified example of the second embodiment.

The procedure of processing of the communication device 5C will first be discussed below with reference to the flowchart of FIG. 11. FIG. 11 is a flowchart illustrating processing of the communication device 5C according to the modified example. The processing illustrated in FIG. 11 can be executed by the RFIC 3 or the control circuit 70.

In the modified example, if it is determined that the SAR exceeds the standard value (Yes in S104), it is determined whether FDD is applied (S301). If it is determined that FDD is applied (Yes in S301), as in the first embodiment, output power is limited to the first maximum output power of the predetermined power class in a sub-period (S106), and output power is limited to the second maximum output power in the subsequent sub-period (S107). If the period for the application of the predetermined power class to the transmission of a signal of FDD band continues (No in S108), the process returns to step S106. If the period for the application of the predetermined power class is over (Yes in S108), the process returns to step S101. With this operation, the permissible maximum output power can be switched between the first maximum output power and the second maximum output power temporally.

If it is determined that FDD is not applied (No in S301), output power is limited to the first maximum output power of the predetermined power class in a sub-period (S302), and output power is limited to the second maximum output power in the subsequent sub-period (S303). The lengths of the sub-periods in steps S302 and S303 may be different from those in steps S106 and S107. If the period for the application of the predetermined power class to the transmission of a signal of TDD band continues (No in S304), the process returns to step S302. If the period for the application of the predetermined power class is over (Yes in S304), the process returns to step S101. With this operation, the permissible maximum output power can be switched between the first maximum output power and the second maximum output power temporally.

[2.4.2 Transition of Permissible Maximum Output Power]

Figure 12:
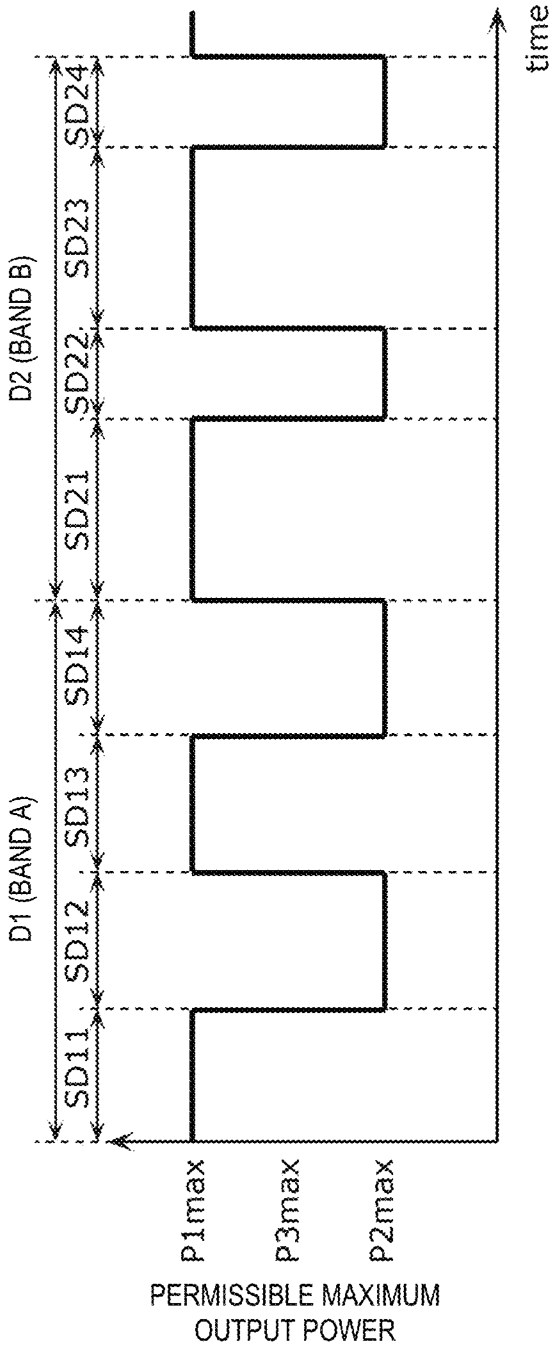
FIG. 12 is a graph illustrating permissible maximum output power with respect to time in the modified example of the second embodiment.

An example of the transition of the permissible maximum output power will now be explained below with reference to FIG. 12. FIG. 12 is a graph illustrating the permissible maximum output power with respect to time in the modified example.

In FIG. 12, the vertical axis indicates the permissible maximum output power, while the horizontal axis indicates the time. On the top portion of the graph, a first period D1 and a second period D2 corresponding to the time are indicated. The first period D1 includes sub-periods SD11 through SD14 that do not overlap each other. The second period D2 includes sub-periods SD21 through SD24 that do not overlap each other. In the modified example, the sub-periods SD11 and SD12 are examples of the first and second sub-periods, respectively, and the sub-periods SD21 and SD22 are examples of the third and fourth sub-periods, respectively.

In the first period D1, a signal of band A is transmitted and the predetermined power class (power class 2, for example) is applied to the transmission of a signal of band A. In the first period D1, the SAR exceeds the standard value.

Hence, as in the case of FIG. 5, the permissible maximum output power is switched between the first maximum output power P1max and the second maximum output power P2max in the first period D1. That is, in the first period D1, the permissible maximum output power is variable and the variable permissible maximum output power is switched between the first maximum output power P1max and the second maximum output power P2max. More specifically, within the first period D1, output power is limited to the first maximum output power P1max in the sub-periods SD11 and SD13, while output power is limited to the second maximum output power P2max in the sub-periods SD12 and SD14.

In the second period D2, a signal of band B is transmitted and the predetermined power class is applied to the transmission of a signal of band B. In the second period D2, the SAR exceeds the standard value.

Hence, the permissible maximum output power is switched between the first maximum output power P1max and the second maximum output power P2max in the second period D2. That is, in the second period D2, the permissible maximum output power is variable and the variable permissible maximum output power is switched between the first maximum output power P1max and the second maximum output power P2max. More specifically, within the second period D2, output power is limited to the first maximum output power P1max in the sub-periods SD21 and SD23, while output power is limited to the second maximum output power P2max in the sub-periods SD22 and SD24.

The value of the ratio (first ratio) of the length of the sub-period SD11 to the total length of the sub-periods SD11 and SD12 is smaller than the value of the ratio (second ratio) of the length of the sub-period SD21 to the total length of the sub-periods SD21 and SD22. That is, the period for which the first maximum output power P1max is allowed for FDD is shorter than that for TDD. To put it in another word, the value of the second ratio is larger than that of the first ratio. That is, the period for which the first maximum output power P1max is allowed for TDD is longer than that for FDD.

The relationship between the value of the first ratio and that of the second ratio is not limited to the above-described relationship. For example, the value of the first ratio may be larger than that of the second ratio or may be the same as that of the second ratio.

[2.5 Advantages of Modified Example of Second Embodiment]

As described above, a radio-frequency circuit 1C according to the modified example further includes a filter circuit 602 that is connected to the power amplifier circuit 10C and that has a pass band including TDD band B. The predetermined power class is also applied to the transmission of a signal of band B in a second period D2. The second period D2 includes sub-periods SD21 and SD22. (iii) If an SAR, which is found at the time of the transmission of a signal of band B with the first maximum output power P1max in the second period D2, does not exceed the standard value, the power amplifier circuit 10C amplifies a signal of band B so that output power of the signal of band B is limited to the first maximum output power P1max in the sub-periods SD21 and SD22. (iv) If the SAR exceeds the standard value, the power amplifier circuit 10C amplifies a signal of band B so that output power of the signal of band B is limited to the first maximum output power P1max in the sub-period SD21 and so that output power of the signal of band B is limited to the second maximum output power P2max in the sub-period SD22.

With this configuration, if the SAR, which is found at the time of the transmission of a signal of TDD band B with the first maximum output power P1max in the second period D2, exceeds the standard value, as the permissible maximum output power for transmitting the signal of TDD band B, the first maximum output power P1max can be used in the sub-period SD21, while the second maximum output power P2max can be used in the sub-period SD22. Hence, in the second period D2, the SAR can be lowered compared with the configuration in which the permissible maximum output power is maintained at the first maximum output power P1max. As a result, the health of a user is less likely to be harmed when the predetermined power class that allows for maximum output power higher than before is applied to a TDD band.

Additionally, for example, in the radio-frequency circuit IC according to the modified example, the value of a first ratio of the length of the sub-period SD11 to a total length of the sub-periods SD11 and SD12 may be different from the value of a second ratio of the length of the sub-period SD21 to a total length of the sub-periods SD21 and SD22.

With this configuration, the proportion of the period for which the first maximum output power P1max is used as the permissible maximum output power for FDD band A and that for TDD band B can be made different from each other. The permissible maximum output power can thus be switched with a length of a period suitable for the characteristics of a FDD band and that for a TDD band.

Additionally, for example, in the radio-frequency circuit 1C according to the modified example, the value of the first ratio may be smaller than the value of the second ratio.

With this configuration, the time for which the first maximum output power P1max is used as the permissible maximum output power for FDD band A can be made shorter than that for TDD band B. It is thus possible to make it less likely to harm the health of a user by the use of an FDD band in which a radio-frequency signal is continuously output.

(Other Embodiments)

The radio-frequency circuits, communication devices, and communication methods according to the present invention have been discussed above through illustration of the embodiments and modified examples thereof. However, the radio-frequency circuits, communication devices, and communication methods according to the invention are not restricted to the above-described embodiments and modified examples. Other embodiments implemented by combining certain elements in the above-described embodiments and modified examples and modified examples obtained by making various modifications to the above-described embodiments and modified examples by those skilled in the art without departing from the scope and spirit of the invention are also encompassed in the invention. Various types of equipment integrating the above-described radio-frequency circuits are also encompassed in the invention.

In one example, in the circuit configurations of the radio-frequency circuits and the communication devices according to the above-described embodiments, another circuit element and another wiring, for example, may be inserted onto a path connecting the circuit elements and signal paths illustrated in the drawings. For example, an impedance matching circuit may be inserted between the power amplifier circuit 10 and the filter circuit 60 and/or between the filter circuit 60 and the antenna connection terminal 101.

Figure 13:
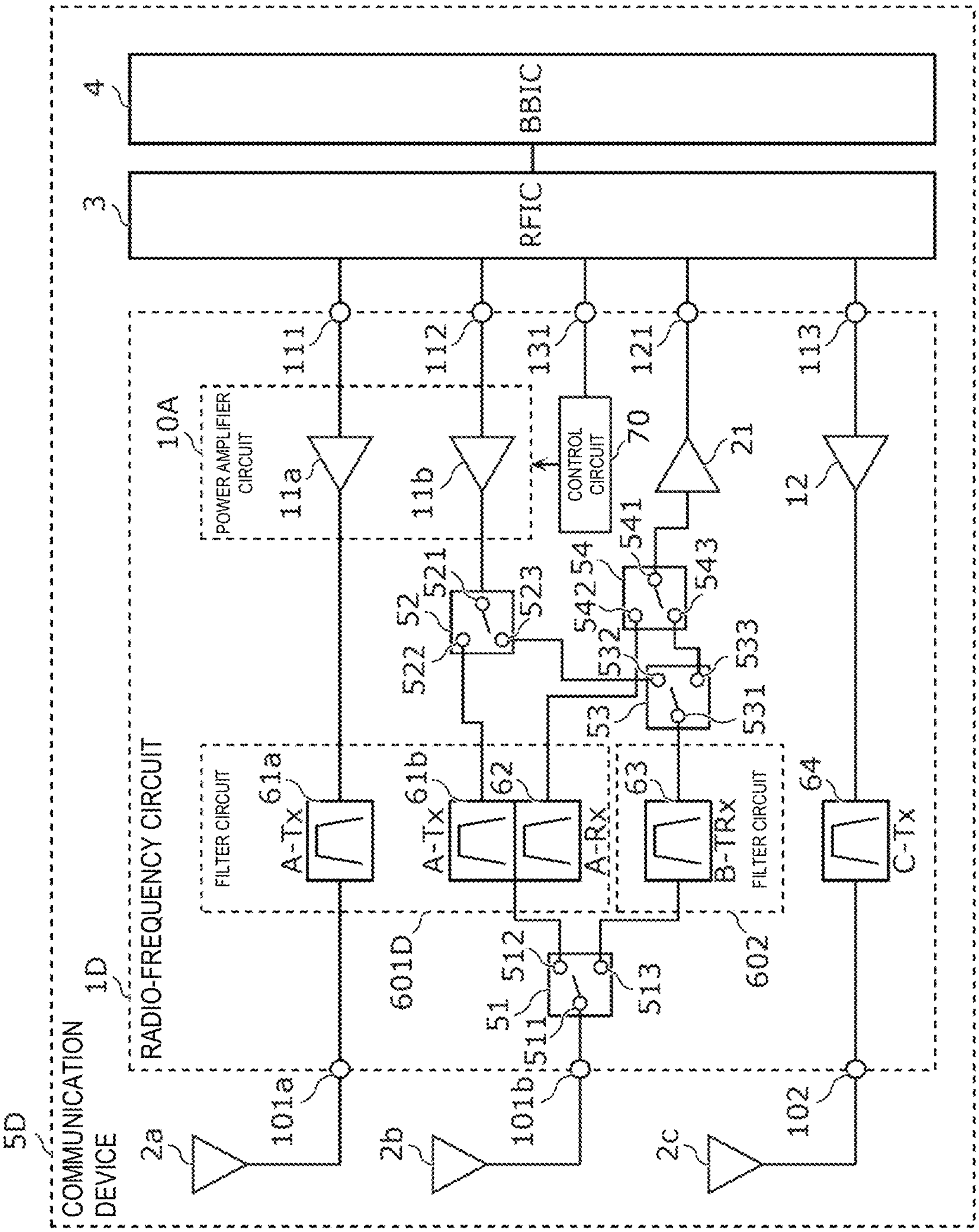
FIG. 13 is a circuit diagram of a radio-frequency circuit and a communication device according to another embodiment.

In another example, the first modified example or the second modified example of the first embodiment may be combined with the second embodiment. The first modified example or the second modified example of the first embodiment may be combined with the modified example of the second embodiment. For example, as a result of combining the second modified example of the first embodiment with the second embodiment and adding a transmit path for FDD or TDD band C, a radio-frequency circuit 1D illustrated in FIG. 13 can be implemented. FIG. 13 is a circuit diagram of the radio-frequency circuit 1D and a communication device 5D according to another embodiment.

The communication device 5D is similar to the communication device 5C according to the second embodiment, except that the communication device 5D includes antennas 2*a* through 2*c* instead of the antenna 2 and the radio-frequency circuit 1D instead of the radio-frequency circuit 1C. The radio-frequency circuit 1D includes a power amplifier circuit 10A, a power amplifier 12, a low-noise amplifier 21, switches 51 through 54, filter circuits 601D and 602, a filter 64, a control circuit 70, antenna connection terminals 101*a*, 101*b*, and 102, radio-frequency input terminals 111 through 113, a radio-frequency output terminal 121, and a control terminal 131.

As in the radio-frequency input terminal 111, the radio-frequency input terminal 112 is an input terminal for receiving a transmission signal of FDD band A from the outside of the radio-frequency circuit 1D. The radio-frequency input terminal 113 is an input terminal for receiving a transmission signal of band C from the outside of the radio-frequency circuit 1D.

The power amplifier 12 is connected between the radio-frequency input terminal 113 and the filter 64 and is able to amplify a transmission signal of band C.

The filter circuit 601D includes filters 61*a*, 61*b*, and 62. The filter circuit 601D is similar to the filter circuit 601, except that it includes the filters 61*a* and 61*b* instead of the filter 61, and an explanation thereof will thus be omitted.

The filter 64 has a pass band including at least part of band C and is connected between the antenna connection terminal 102 and the power amplifier 12. More specifically, one end of the filter 64 is connected to the antenna connection terminal 102, and the other end of the filter 64 is connected to the output terminal of the power amplifier 12. Band C may be either one of an FDD band or a TDD band.

The radio-frequency circuit 1D configured as described above is able to perform simultaneous transmission of a signal of band A to which the predetermined power class (power class 2, for example) is applied and a signal of band C to which a power class whose maximum output power is lower than that of the predetermined power class (power class 3, for example) is applied. The radio-frequency circuit 1D is also able to perform simultaneous transmission of signals of band A, band B, and band C to which a power class whose maximum output power is lower than that of the predetermined power class (power class 3, for example) is applied.

The radio-frequency circuit 1D can be implemented by using any of a variety of circuit implementations and circuit technologies. For example, the radio-frequency circuit 1D can be distributed over two module laminates and be mounted thereon. In this case, the power amplifier 11*a* and the filter 61*a* may be mounted on one of the two module laminates, while the power amplifiers 11*b* and 12, low-noise amplifier 21, switches 51 through 54, and filters 61*b*, 62, 63, and 64 may be mounted on the other one of the two module laminates.

INDUSTRIAL APPLICABILITY

The present invention can be widely used in communication equipment, such as mobile phones, as a radio-frequency circuit disposed in a front-end section.

The invention claimed is:

1. A radio-frequency circuit comprising:

a power amplifier circuit that supports a predetermined power class which allows for first maximum output power, the first maximum output power being maximum output power of power class 2 or higher; and a first filter circuit that is connected to the power amplifier circuit and that has a pass band including an uplink operating band of a first band for Frequency Division Duplex, wherein the predetermined power class is applied to transmission of a signal of the first band in a first period, the first period includes first and second sub-periods, (i) if a first SAR (Specific Absorption Rate), which is found at a time of the transmission of a signal of the first band with the first maximum output power in the first period, does not exceed a standard value, the power amplifier circuit amplifies a signal of the first band so that output power of the signal of the first band is limited to the first maximum output power in the first and second sub-periods, and (ii) if the first SAR exceeds the standard value, the power amplifier circuit amplifies a signal of the first band so that output power of the signal of the first band is limited to the first maximum output power in the first sub-period and so that output power of the signal of the first band is limited to second maximum output power in the second sub-period and so that an average SAR over the first period and subsequent periods remains at or below the standard value, the second maximum output power being lower than the first maximum output power.

2. The radio-frequency circuit according to claim 1, wherein:

the first period includes third and fourth sub-periods which follow the first and second sub-periods;

(i) if the first SAR does not exceed the standard value, the power amplifier circuit amplifies a signal of the first band so that output power of the signal of the first band is limited to the first maximum output power in the first, second, third, and fourth sub-periods; and (ii) if the first SAR exceeds the standard value, the power amplifier circuit amplifies a signal of the first band so that output power of the signal of the first band is limited to the first maximum output power in the first and third sub-periods and so that output power of the signal of the first band is limited to the second maximum output power in the second and fourth sub-periods.

3. The radio-frequency circuit according to claim 2, wherein:

a length of the first sub-period is identical to a length of the third sub-period; and a length of the second sub-period is identical to a length of the fourth sub-period.

4. The radio-frequency circuit according to claim 1, wherein:

the predetermined power class is applied to transmission of a signal of the first band in a second period which follows the first period; and the power amplifier circuit amplifies a signal of the first band so that a difference between an average of maximum output power per unit time which is permitted for transmitting the signal of the first band in the first period and an average of maximum output power per unit time which is permitted for transmitting the signal of the first band in the second period becomes smaller than a predetermined threshold.

5. The radio-frequency circuit according to claim 1, wherein the second maximum output power is lower than third maximum output power of power class 3.

6. The radio-frequency circuit according to claim 1, further comprising:

a second filter circuit that is connected to the power amplifier circuit and that has a pass band including a second band for Time Division Duplex, wherein the predetermined power class is also applied to transmission of a signal of the second band in a second period, the second period includes third and fourth sub-periods, and the power amplifier circuit amplifies a signal of the second band so that output power of the signal of the second band is limited to the first maximum output power in the third and fourth sub-periods.

7. The radio-frequency circuit according to claim 1, further comprising:

a second filter circuit that is connected to the power amplifier circuit and that has a pass band including a second band for Time Division Duplex, wherein the predetermined power class is also applied to transmission of a signal of the second band in a second period, the second period includes third and fourth sub-periods, (iii) if a second SAR, which is found at a time of transmission of a signal of the second band with the first maximum output power in the second period, does not exceed the standard value, the power amplifier circuit amplifies a signal of the second band so that output power of the signal of the second band is limited to the first maximum output power in the third and fourth sub-periods, and (iv) if the second SAR exceeds the standard value, the power amplifier circuit amplifies a signal of the second band so that output power of the signal of the second band is limited to the first maximum output power in the third sub-period and so that output power of the signal of the second band is limited to the second maximum output power in the fourth sub-period.

8. The radio-frequency circuit according to claim 7, wherein a value of a first ratio of a length of the first sub-period to a total length of the first and second sub-periods is different from a value of a second ratio of a length of the third sub-period to a total length of the third and fourth sub-periods.

9. The radio-frequency circuit according to claim 8, wherein the value of the first ratio is smaller than the value of the second ratio.

10. The radio-frequency circuit according to claim 1, wherein:

(i) if the first SAR does not exceed the standard value, the power amplifier circuit amplifies a signal of the first band by using a first power supply voltage in the first period; and (ii) if the first SAR exceeds the standard value, the power amplifier circuit amplifies a signal of the first band by using the first power supply voltage in the first sub-period and amplifies the signal of the first band by using a second power supply voltage in the second sub-period, the second power supply voltage being lower than the first power supply voltage.

11. The radio-frequency circuit according to claim 1, further comprising:

a combiner including a first input terminal, a second input terminal, and an output terminal connected to an antenna connection terminal, wherein the power amplifier circuit includes a first power amplifier, and a second power amplifier, and wherein the first filter circuit includes a first filter that has a pass band including the uplink operating band of the first band and that is connected between the first power amplifier and the first input terminal of the combiner, and a second filter that has a pass band including the uplink operating band of the first band and that is connected between the second power amplifier and the second input terminal of the combiner.

12. The radio-frequency circuit according to claim 1, wherein:

the power amplifier circuit includes a first power amplifier, and a second power amplifier; and the first filter circuit includes a first filter that has a pass band including the uplink operating band of the first band and that is connected between the first power amplifier and a first antenna connection terminal, and a second filter that has a pass band including the uplink operating band of the first band and that is connected between the second power amplifier and a second antenna connection terminal.

13. A communication device comprising:

a signal processing circuit that processes a radio-frequency signal; and the radio-frequency circuit according to claim 1 that transfers the radio-frequency signal between the signal processing circuit and an antenna.

14. A communication method comprising:

under a condition a predetermined power class is applied to transmission of a signal of a first band in a first period including first and second sub-periods, the predetermined power class allowing for first maximum output power, the first maximum output power being maximum output power of power class 2 or higher, (i) limiting output power of a signal of the first band to the first maximum output power in the first and second sub-periods if a first SAR, which is found at a time of transmission of a signal of the first band with the first maximum output power in the first period, does not exceed a standard value; and (ii) limiting output power of a signal of the first band to the first maximum output power in the first sub-period and limiting output power of the signal of the first band to second maximum output power in the second sub-period so an average SAR over the first period and subsequent periods remains at or below the standard value in a case that the first SAR exceeds the standard value, the second maximum output power being lower than the first maximum output power.

15. The communication method according to claim 14, wherein:

the first maximum output power, is a variable maximum output power, and the method further comprising repeatedly switching the variable maximum output power between a first threshold maximum output power and another output power that is less than the first threshold maximum output power.

16. A radio-frequency circuit comprising:

a power amplifier circuit that supports a predetermined power class which allows for first maximum output power, the first maximum output power being maximum output power of power class 2 or higher; and a filter circuit that is connected to the power amplifier circuit and that has a pass band including an uplink operating band of a first band for Frequency Division Duplex, wherein under a condition that the predetermined power class is applied to transmission of a signal of the first band, the power amplifier circuit amplifies a signal of the first band so that output power of the signal of the first band is limited to variable maximum output power, and the variable maximum output power is repeatedly switched between the first maximum output power and second maximum output power, the second maximum output power being lower than the first maximum output power so that an average specific absorption rate (SAR) over time remains at or below the standard value.

17. The radio-frequency circuit according to claim 16, wherein the variable maximum output power is periodically switched between the first maximum output power and the second maximum output power.

18. The radio-frequency circuit according to claim 17, further comprising:

a combiner including a first input terminal, a second input terminal, and an output terminal connected to an antenna connection terminal, wherein the power amplifier circuit includes a first power amplifier, and a second power amplifier, and wherein the filter circuit includes a first filter that has a pass band including the uplink operating band of the first band and that is connected between the first power amplifier and the first input terminal of the combiner, and a second filter that has a pass band including the uplink operating band of the first band and that is connected between the second power amplifier and the second input terminal of the combiner.

19. The radio-frequency circuit according to claim 17, wherein:

the power amplifier circuit includes a first power amplifier, and a second power amplifier; and the filter circuit includes a first filter that has a pass band including the uplink operating band of the first band and that is connected between the first power amplifier and a first antenna connection terminal, and a second filter that has a pass band including the uplink operating band of the first band and that is connected between the second power amplifier and a second antenna connection terminal.

20. A communication device comprising:

a signal processing circuit that processes a radio-frequency signal; and the radio-frequency circuit according to claim 16 that transfers the radio-frequency signal between the signal processing circuit and an antenna.

* * * * *